United States Patent [19]
Watanabe et al.

[11] Patent Number: 6,032,862
[45] Date of Patent: Mar. 7, 2000

[54] BAR CODE READER AND BAR CODE READING METHOD

[75] Inventors: Mitsuo Watanabe; Motohiko Itoh; Hiroaki Kawai; Isao Iwaguchi; Shinichi Sato, all of Kawasaki, Japan

[73] Assignee: Fujitsu Limited, Kawasaki, Japan

[21] Appl. No.: 09/069,946

[22] Filed: Apr. 30, 1998

[30] Foreign Application Priority Data

Nov. 26, 1997 [JP] Japan .................................. 9-324681

[51] Int. Cl.⁷ .................................................. G06K 7/10
[52] U.S. Cl. ........................................ 235/462; 235/462.1
[58] Field of Search ........................... 235/462.1, 462.11, 235/462.12, 462.14, 462.16, 462.17, 462.25, 494, 437, 438

[56] References Cited

U.S. PATENT DOCUMENTS

| | | | |
|---|---|---|---|
| 5,200,598 | 4/1993 | Rencontre | 235/472.01 |
| 5,734,430 | 3/1998 | Mishima et al. | 348/398 |
| 5,793,432 | 8/1998 | Mishima et al. | 348/432 |

*Primary Examiner*—Thien M. Le
*Attorney, Agent, or Firm*—Armstrong, Westerman, Hattori, McLeland & Naughton

[57] ABSTRACT

The present invention introduce a bar code reader capable of inferring data coded into one character failing in demodulation when one character can not be demodulated. The CPU demodulates the data obtained by reading bar code for each data character. Concerning the data character failing in demodulation, bar width data for four bars before demodulation is stored in the temporary saving buffer. When 11 data characters are successful in demodulation, the CPU calculates back the modulus 10 check based on the demodulated data corresponding to 11 data characters, and infers a value of the demodulated data corresponding to the data character failing in demodulation. The CPU, when the data character failing in demodulation is contained in the left data block, infers an ODD/EVEN configuration of the demodulated data corresponding to the data character failing in demodulation based on five pieces of demodulated data corresponding to data characters successful in demodulation in the left data block.

12 Claims, 28 Drawing Sheets

FIG. 3

| 15 | 14 | 13 | 12 | 11 | 10 | 9 | 8 | 7 | 6 | | 2 | 1 | 0 |
|---|---|---|---|---|---|---|---|---|---|---|---|---|---|
| C128 | CHR-L | CHR-F | WERR | W/B | BCD10 | BCD9 | BCD8 | BCD7 | BCD6 | - - - - | BCD2 | BCD1 | BCD0 |

FIG. 7

| STORAGE INFORMATION |
| --- |
| NUMBER OF DEMODULATED DIGITS IN LEFT BLOCK |
| NUMBER OF DEMODULATED DIGITS IN RIGHT BLOCK |
| ──────────(LGB)── |
| DEMODULATED DATA ·(LEFT BLOCK) |
| ──────(CB)────── |
| DEMODULATED DATA ·(RIGHT BLOCK) |
| ──────(RGB)── |
| BAR DATA (FOUR PIECES) |
| CHARACTER LENGTH DATA (ONE PIECE) |

FIG. 29

| CHARACTER | NUMBER OF MODULES | | | | | | CHARACTER | NUMBER OF MODULES | | | | | |
|---|---|---|---|---|---|---|---|---|---|---|---|---|---|
| | a | b | c | d | T1 | T2 | | a | b | c | d | T1 | T2 |
| O-0 | 3 | 2 | 1 | 1 | 3 | 2 | E-0 | 1 | 1 | 2 | 3 | 3 | 5 |
| O-1 | 2 | 2 | 2 | 1 | 4 | 3 | E-1 | 1 | 2 | 2 | 2 | 4 | 4 |
| O-2 | 2 | 1 | 2 | 2 | 3 | 4 | E-2 | 2 | 2 | 1 | 2 | 3 | 3 |
| O-3 | 1 | 4 | 1 | 1 | 5 | 2 | E-3 | 1 | 1 | 4 | 1 | 5 | 5 |
| O-4 | 1 | 1 | 3 | 2 | 4 | 5 | E-4 | 2 | 3 | 1 | 1 | 4 | 2 |
| O-5 | 1 | 2 | 3 | 1 | 5 | 4 | E-5 | 1 | 3 | 2 | 1 | 5 | 3 |
| O-6 | 1 | 1 | 1 | 4 | 2 | 5 | E-6 | 4 | 1 | 1 | 1 | 2 | 2 |
| O-7 | 1 | 3 | 1 | 2 | 4 | 3 | E-7 | 2 | 1 | 3 | 1 | 4 | 4 |
| O-8 | 1 | 2 | 1 | 3 | 3 | 4 | E-8 | 3 | 1 | 2 | 1 | 3 | 3 |
| O-9 | 3 | 1 | 1 | 2 | 2 | 3 | E-9 | 2 | 1 | 1 | 3 | 2 | 4 |

| FLAG CHARACTER | CHARACTER STRUCTURE IN LEFT BLOCK | | | | | | CHARACTER STRUCTURE IN RIGHT BLOCK | | | | | | STRUCTURE |
|---|---|---|---|---|---|---|---|---|---|---|---|---|---|
| 0 | O | O | O | O | O | O | E | E | E | E | E | E | UPC/A |
| 1 | O | O | E | O | E | E | E | E | E | E | E | E | EAN13 |
| 2 | O | O | E | E | O | E | E | E | E | E | E | E | |
| 3 | O | O | E | E | E | O | E | E | E | E | E | E | |
| 4 | O | E | O | O | E | E | E | E | E | E | E | E | |
| 5 | O | E | E | O | O | E | E | E | E | E | E | E | |
| 6 | O | E | E | E | O | O | E | E | E | E | E | E | |
| 7 | O | E | O | E | O | E | E | E | E | E | E | E | |
| 8 | O | E | O | E | E | O | E | E | E | E | E | E | |
| 9 | O | E | E | O | E | O | E | E | E | E | E | E | |

BAR CODE READER AND BAR CODE READING METHOD

BACKGROUND OF THE INVENTION

1. Field of the Invention

The present invention relates to a bar code reader and a bar code reading method reading a bar code based on a variation of reflected light quantity obtained by scanning the bar code.

2. Description of the Related Art

In late years, it generalized that items for sale are managed by the bar code as represented by the POS (point-of-sale) system in distribution business or the like. For example, in the POS system in a store, information such as a kind and a price of an item is coded into a bar code, and the bar code is printed on the item. At the checkout counter, the scanning light is irradiated on the bar code, the quantity of the reflected light is detected, and data coded into the bar code is read, whereby the payment for the items is cleared based on the data. At the same time, the sales number of the item is added up in real time, and it is used for inventory control and stock control.

Such bar codes are roughly classified into the WPC code such as the JAN code, the UPC code and the EAN code, and the second code of variable length.

Among these, the WPC code is provided with a start guard bar (SGB) added to the leftmost edge, the center bar (CB) inserted in an intermediate part and the end guard bar (EGB) added to the rightmost edge, and is stored with a left data block including 6 or 4 data characters between the start guard bar and the center bar, and with a right data block including 6 or 4 data characters between the center bar and the end guard bar.

Further, concerning the WPC code, there is a WPC code called 13-digit bar code. In this 13-digit bar code, each character in the left data block is represented by an even parity character (the character in which the number of modules of two black bars is even) or an odd parity character (the character in which the number of modules of two black bars is odd), and a value corresponding the is combination of the even parities and the odd parities is represented as the 13th character (flag character), whereby the 13-digit information is kept.

Accordingly, in order to demodulate the flag character in the 13-digit bar code, it is necessary to complete the normal demodulation of 6-digit data characters in the left data block at least.

According to the standard of the WPC code, when 12 pieces of data in the 13-digit bar code are alternately classified as odd portions and as even portions in a condition that the rightmost character is classified as the odd portion (the flag character is classified as the odd portion), the sum of three time of the total of the numeral values of the data characters in the odd portions and the total of the numeral values of the data characters in the even portions becomes an integral multiple of 10. By using this standard, it is easily possible to confirm whether the demodulated data corresponding to the bar code is reproduced when a plurality of the demodulated data obtained by the block reading are combined. Such an confirmation is called "modulus 10 check".

Accordingly, the 6-digit data characters in the right data block must be completely demodulated normally in order to execute this modulus 10 check.

However, a bar code reader cannot read the bar code accurately when there are creases on a bag and paper to which the bar code is printed or when the bar code is printed out of position. Further, though the reflected light received by the bar code reader is a diffusive reflected light on the bar code surface, there is a case that the bar code receives not enough reflected light of the light quantity corresponding to the color of each bar in the bar code according to the condition of the bar code surface.

In such cases, when only one character is not demodulated in failure, it is impossible to calculate 13th character and to execute the modulus 10 check with only data obtained by the scanning in this condition. As a result, it is necessary to read the same bar code many times, and to join small pieces of data respectively obtained.

SUMMARY OF THE INVENTION

The present invention is developed in views of the above-described problems and has its object to provide a bar code reader and a bar code reading method capable of presuming data coded into one character failing in demodulation based on demodulated data obtained by demodulating another character when only one character is not demodulated.

The present invention introduces the following aspects in order to solve the above problems.

A bar code reader of the first aspect according to the present invention is provided with a bar width pattern detection unit for reading a bar code being stored with a plurality of data characters, each of the data characters obtained by coding a predetermined pieces of data satisfying a predetermined conditional expression to detect a bar width pattern; a demodulation unit for demodulating the bar width pattern detected by the bar width pattern detection means for each of the data characters and for outputting demodulated data; and a data inference unit, when one data character in the bar code fails in being demodulated, for executing an inverse operation of the conditional expression based on demodulated data obtained by demodulating the other data characters in the bar code with the demodulation unit to infer data coded into the data character failing in being demodulated with the demodulation unit.

With this configuration, the bar width pattern detection unit reads the bar code being stored with a plurality of data characters obtained by coding a predetermined pieces of data satisfying a conditional expression, and detects the read bar width pattern. The demodulation unit demodulates the bar width pattern detected by the bar width pattern detection unit every data character, and outputs demodulated data. When one data character in the bar code fails in being demodulated with the demodulation unit, the data inference unit executes the inverse operation of the conditional expression based on a numerical value obtained by demodulating all other data characters in the bar code and infers data coded into the data character failing in being demodulated with the demodulation unit. As a result, it is possible to get the demodulated data corresponding to the bar code promptly.

A bar code reader of the second aspect is specified by that the data character is obtained by coding an even-odd parity distinction and the data, and the bar code is stored with a plurality of the data characters in accordance with one combination among predetermined combinations of the even parity and the odd parity.

A bar code reader of the third aspect is specified by that the demodulation unit demodulates the bar width pattern detected by the bar width pattern detection unit for each of the data characters and outputs the data and the even-odd parity distinction, and that further comprises a parity inference unit, when the demodulation unit fails in demodulating one data character in the bar code, for specifying the predetermined combinations corresponding to combinations of even-odd parity distinctions obtained by demodulating the other data characters in the bar code with the demodulation unit, and for reading the even-odd parity distinction corresponding to the data character failing in being demodulated with the demodulation unit among the specified combinations.

A bar code reader of the fourth aspect is further provided with a comparison unit for comparing a first bar width pattern corresponding to the data character failing in being demodulated with the demodulation unit and a second bar width pattern corresponding to data inferred by the data inference unit; and a validating unit for validating the data inferred by the data inference unit only when the first bar width patten is coincide with the second bar width pattern at least partly as a result of comparison by said comparison unit.

With this configuration, it is possible to inspect the inference result, therefore, it is possible to improve reliability.

A bar code reader of the fifth aspect is specified by that the comparison unit compares bar widths of each pair of bars in the first bar width pattern and in the second bar width pattern, said each pair of bars corresponding to each other, and that the validating unit validates the data inferred by the data inference unit only when a ratio of bar widths of any one pair of bars is within a predetermined ratio.

A bar code reader of the sixth aspect is specified by that the validating unit, when a ratio of bar widths of any one pair of bars is within a first predetermined ratio, immediately validates the data, and, when the ratio of bar widths of any one pair of bars is within a second predetermined ratio exceeding the first predetermined ratio, restarts the bar width pattern detection unit, the demodulation unit and the data inference unit, and validates the data only when a the ratio of bar widths of the pair of bars is within the second predetermined ratio after the restarting.

With this configuration, while it is possible to validate the inference result promptly in a case that the reliability of the inference result is high since the ratio of bar widths of a pair of bars is within the first predetermined ratio, it is possible to restart the bar width pattern detection unit, the demodulation unit and the data inherence unit in a case that the reliability of the inference result is comparatively low since the ratio of bar widths of a pair of bars exceeds the first predetermined ratio, therefore, it is possible to improve the reliability of the inference result.

A bar code reader of the seventh aspect is further provided with a comparison unit for comparing a first bar width pattern corresponding to the data character failing in being demodulated with the demodulation unit and a second bar width pattern corresponding to data inferred by the data inference unit and corresponding to the even-odd parity distinction inferred by the parity inference unit; and a validating unit for validating the data inferred by the data inference unit and the even-odd parity distinction inferred by the parity inference unit only when the first bar width patten is coincide with the second bar width pattern at least partly as a result of comparison by the comparison unit.

With this configuration, it is possible to inspect the inference result, therefore, it is possible to improve the reliability of the inference result.

A bar code reader of the eighth aspect is specified by that the comparison unit compares bar widths of each pair of bars in the first bar width pattern and in the second bar width pattern, the each pair of bars corresponding to each other, and that the validating unit validates the data inferred by the data inference unit and the even-odd parity distinction inferred by the parity inference unit when a ratio of bar widths of one pair of bars is within a predetermined ratio.

A bar code reader of the ninth aspect is specified by that the validating unit, when a ratio of bar widths of any one pair of bars is within a first predetermined ratio, immediately validates the data, and, only when the ratio of bar widths of any one pair of bars is within a second predetermined ratio exceeding the first predetermined ratio, restarts the bar width pattern detection unit, the demodulation unit, the data inference unit and the parity inference unit, and validates the data and the distinction of an even party or an odd parity only when a the ratio of bar widths of one pair of bars is within the second predetermined ratio after the restarting.

With this configuration, while it is possible to validate the inference result promptly in a case that the reliability of the inference result is high since the ratio of bar widths of a pair of bars is within the first predetermined ratio, it is possible to restart the bar width pattern detection unit, the demodulation unit and the data inherence unit in a case that the reliability of the inference result is comparatively low since the ratio of bar widths of a pair of bars exceeds the first predetermined ratio, therefore, it is possible to improve the reliability of the inference result.

A bar code reader of the tenth aspect is further provided with a validating unit for immediately validating the data inferred by the data inference when the demodulation unit demodulates data characters except one data character in the bar code based on a bar width pattern obtained by once scanning with the bar width pattern detection unit, and for restarting the bar width pattern detection unit, the demodulation unit and the data inference unit and for validating the data inferred by the data inference after the restarting when the demodulation unit demodulates data characters except one data character in the bar code based on a bar width pattern obtained by plural times of scanning with the bar code width detection unit.

With this configuration, while it is possible to validate the inference result promptly in a case that the reliability of the inference result is high since the bar width pattern is obtained by the continuous reading, it is possible to restart the bar width pattern detection unit, the demodulation unit and the data inherence unit in a case that the reliability of the inference result is comparatively low since the bar width pattern is obtained by the divided reading, therefore, it is possible to improve the reliability of the inference result.

A bar code reader of the eleventh aspect is further provided with a validating unit for immediately validating the data inferred by the data inference unit and the even-odd parity distinction inferred by the parity inference unit when the demodulation unit demodulates data characters except one data character in the bar code based on a bar width pattern obtained by once scanning with the bar width pattern detection unit, and for restarting the bar width pattern detection unit, the demodulation unit and the data inference unit and for validating the data inferred by the data inference unit and the even-odd parity distinction inferred by the parity inference unit after the restarting when the demodulation unit demodulates data characters except one data character in the bar code based on a bar width pattern obtained by plural times of scanning with the bar width pattern detection unit.

With this configuration, while it is possible to validate the inference result promptly in a case that the reliability of the inference result is high since the bar width pattern is obtained by the continuous reading, it is possible to restart the bar width pattern detection unit, the demodulation unit and the data inherence unit in a case that the reliability of the inference result is comparatively low since the bar width pattern is obtained by the divided reading, therefore, it is possible to improve the reliability of the inference result.

A method of reading a bar code in the twelfth aspect is provided with a step of reading a bar code being stored with a plurality of data characters obtained by coding a predetermined pieces of data satisfying a predetermined conditional expression to detect a bar width pattern; a step of demodulating the bar width pattern which is detected for each of the data characters and of outputting demodulated data; and a step, when one data character fails in being demodulated, of executing an inverse operation of the conditional expression based on data obtained by demodulating the other data characters in the bar code to infer data coded into the data character failing in being demodulated.

BRIEF DESCRIPTION OF THE DRAWINGS

Other objects and advantages of the present invention will become apparent during the following discussion conjunction with the accompanying drawings, in which:

FIG. 3 is a view showing a format of bar width data;

FIG. 7 is a structural view showing a first demodulation completion buffer;

FIG. 29 is a list showing combinations of bar width patterns of data characters in the bar code and demodulated data;

DETAILED DESCRIPTION OF THE PREFERRED EMBODIMENT

Hereinafter, explanations will be given of embodiments of the present invention with reference to drawings.

(Structure of 13-digit bar code)

Figure 25:
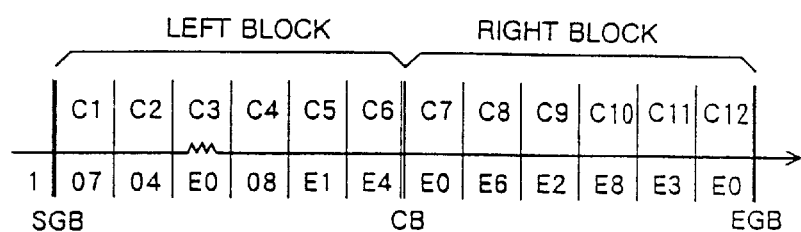
FIG. 25 is a view showing a case that 1-character in the left data block of the bar code fails in demodulation.

First, an explanation will be given of a 13-digit bar code to be read by an bar code reader according to the embodiment of the present invention with reference to FIGS. 25 through 30. As shown in FIGS. 25 and 27, a 13-digit bar code (WPC code) is provided with a start guard bar (SGB) consisting of fixed-pattern bars (three bars of black, white, black, each of bars consisting of 1 module) in rightmost, a center bar (CB) consisting of fixed-pattern bars (five bars of white, black, white, black, white, each of bar consisting of 1 module) in middle, and an end guard bar (EGB) consisting of fixed-pattern bars (three bars of black, white, black, each of bars consisting of 1 module) in leftmost. The bar code is also provided with a left data block consisting of 6 data characters (C1 through C6) between the start guard bar (SGB) and the center bar (CB), and a right data block consisting of 6 data characters (C7 through C12) between the center bar (CB) and the end guard bar (EGB).

Figure 26:
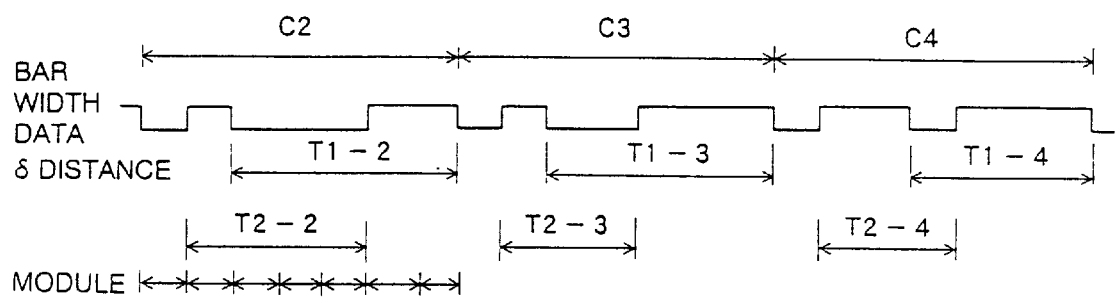
FIG. 26 is a view showing a bar width pattern of 1-character failing in demodulation shown in FIG. 25.
Figure 27:
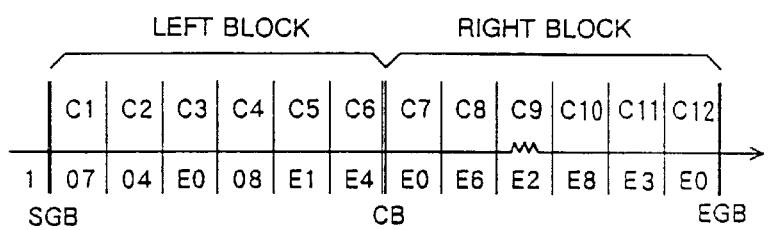
FIG. 27 is a view showing a case that 1-character in the right data block of the bar code fails in demodulation.
Figure 28:
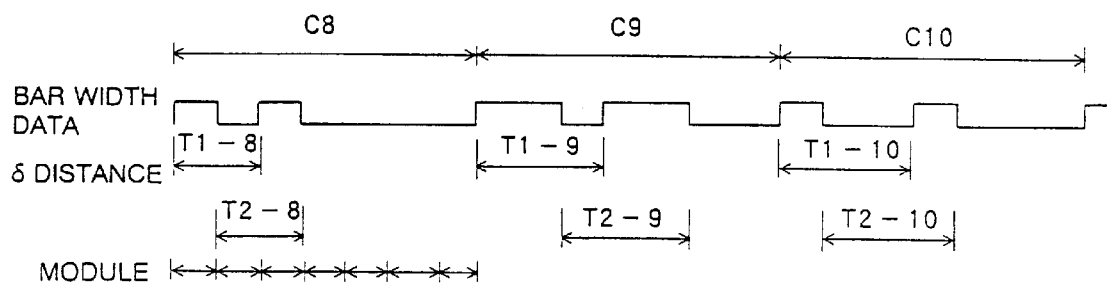
FIG. 28 is a view showing a bar width pattern of 1-character failing in demodulation shown in FIG. 27.

Each data character (C1 though C12), as shown in FIGS. 26 and 28, consists of a combination of two white bars and two black bars formed by appropriately assigning white or black to each of seven modules (each module having a unit length). Then, in each data character (C1 through C6) of the left data block, four bars to be each data character are arranged in order of white bar (a), black bar (b), white bar (c), and black bar (d) from the start guard bar (SGB), and in each data character (C7 through C12) of the right data block, four bars are arranged in order of white bar (a), black bar (b), white bar (c), and black bar (d) from the end guard bar (EGB).

FIG. 29 is a list showing all bar width (module number) patterns capable being each bar (a, b, c, d) of data character and numerical values corresponding to the bar width patterns. In addition, "E-" add to the numeral value indicates a data character of even parity (character in which the sum of modules of both black bars (b, d) is even), and "O-" indicates a data character of odd parity (character in which the sum of modules of both black bars (b, d) is odd). Then, in each data character, T1 indicates a bar width (number of modules) obtained by summing black bar (d) and white bar (c) of the center bar (CB) and T2 indicates a bar width (number of modules) obtained by summing black bar (c) and the guard bar (SGB or EGB), and both are called "δ distance".

Figures 30, 31:
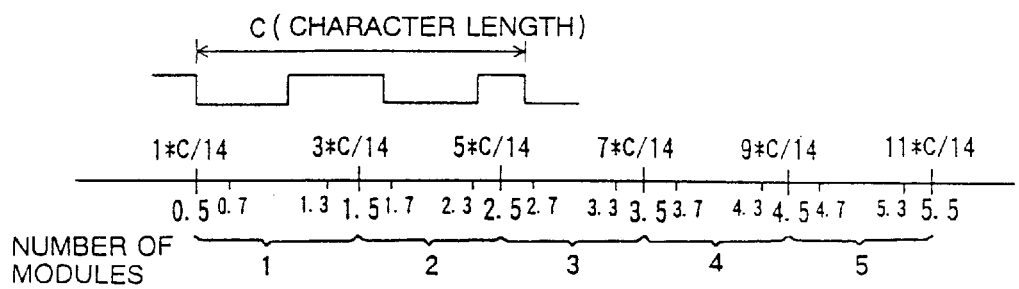
FIG. 30 is a list showing combinations of ODD/EVEN structures of data characters in the bar code and flag characters.
FIG. 31 is a coordinate used for module number calculation.

According to the standard of the WPC code, the right data block consists of only data characters of even parity, and the left data block consists of data characters of even parity and data characters of odd parity. However, combinations of even parity and odd parity of 6 data characters in the left data block are limited to 10 ways as shown in FIG. 30 according to the standard of the WPC code. Further, one numeral value (0 through 9), namely, a flag character is defined for each combination. As shown in FIG. 30, each combination patten of even parity and odd parity (hereinafter, called "ODD/EVEN structure") capable being taken by 6 data characters in the left data block differs from another combination pattern in two or more characters.

Further, as above described, according to the standard of the WPC code, when 12 data characters in the 13 digit-bar code are sequentially classified into odd positions or even positions in assuming that the rightmost data character is classified into the odd position (the flag character is classified into the odd position), the sum of three times of the total of numeral values of data characters in the odd positions and the total of numeral values of data characters in the even positions becomes an integral multiple of 10. This is "a predetermined conditional expression".

(Principle of Omitted Character Inference)

Next, an explanation will be given of principle for inferring data (numerical value and ODD/EVEN structure) coded into data character failing in demodulation based on 11-digit demodulated data when one data character in the 13-digit bar code fails in demodulation.

<In case of left data block>

Now, as shown in FIG. 25, it is assumed that each data of O7, O4, E0, O8, E1, E4, E0, E6, E2, E8, E5, and E0 is sequentially coded into each data character in the 13-digit bar code from the first character (C1). Then, it is assumed that the third data character (C3) in the left data block fails in demodulation.

In this case, when all remaining data characters are demodulated, it is understood that the combination pattern of the ODD/EVEN structure is "OO-OEE". As above described, any of combination patterns of the ODD/EVEN structure capable becoming 6 data characters in the left data block differs from another combination pattern of the ODD/EVEN structure in two or more characters. Accordingly, when any of data characters is omitted, the combination pattern of the ODD/EVEN structure of remaining 5 characters differs from another combination pattern of the ODD/EVEN structure in one character at least. In the case shown in FIG. 25, the flag character corresponding to the combination pattern of the ODD/EVEN structure equivalent to "OO-OEE" is only "1". Accordingly, it is certainly understood that the ODD/EVEN structure of omitted data is EVEN (odd parity).

Then, according to the above-described standard of the WPC modulus 10 check, when the assumption is good in that 11 demodulated characters are correct, it is possible to infer a numerical value of one omitted data by applying values of these 11 characters to the conditional expression of the modulus 10 check. In the case shown in FIG. 25, as shown in the following expressions, the total of demodulated data (containing the flag character) in odd number positions is "31", and the total of demodulated data (except omitted data C3) in even positions is "13".

(C1+C3+C5+C7+C9+C11)*3+(flag character+C2+C4+C6+C8+C10+C12)=integral multiple of 10

(7+?+1+0+2+3)*3+(1+4+8+4+6+8+0)=integral multiple of 10

(13+?)*3+(31)=integral multiple of 10

Accordingly, when the result of the above-described modulus check 10 is good, the numerical value coded into the omitted data character C3 must be "0". In this way, it is possible to infer "0" as the numerical value which might be coded into one omitted data character C3.

The numerical value inferred in this way may be used as it is, however, it is desirable to inspect the inference result in order to ensure the accuracy thereof since the numerical value is inferred on the assumption that 11 demodulated characters are correct. So, the inferred ODD/EVEN structure and the bar width pattern corresponding to the numerical value are read from the list shown in FIG. 29, the number of modules of each bar to be the read bar width pattern is compared with the bar width data actually detected as to the data character failing in modulation, and it is determined whether any of the δ distance T-1, the δ distance T-2, the black bar (b), and the black (d) is coincide, whereby the inference result becomes accurate.

(Outline)

Next, an explanation will be given of an outline of the present invention.

Figure 1:
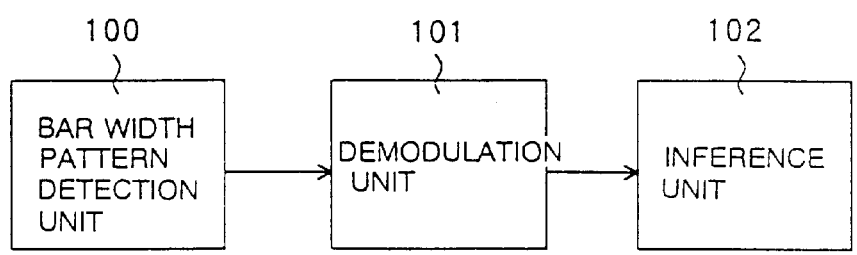
FIG. 1 is a view showing an outline of the present invention.

A bar code reader according to the present invention, as shown in FIG. 1, is provided with a bar width pattern detection unit 100 reading a bar code storing with a plurality of data characters obtained by coding a predetermine number of pieces of data satisfying a predetermined conditional expression and detecting the read bar code, a demodulation unit 101 demodulating the bar code detected by the bar code detection unit and outputting demodulated data, and an inference unit 102, when one data character in the bar code is not demodulated, calculating back the conditional expression based on demodulated data obtained by demodulating other data characters in the bar code with the demodulation unit and inferring data coded into the data character not demodulated with the demodulation unit.

With this configuration, the bar width pattern detection unit (100) reads the bar code being stored with plural data characters obtained by coding the predetermined number of pieces of data satisfying the constant conditional expression, and detects the read bar with pattern. The demodulation unit 101 demodulates the bar code detected by the bar width pattern detection unit every data character, and outputs demodulated data. When one data character in the bar code fails in being demodulated by the demodulation unit 101, the data inference unit (102) calculates back the conditional expression based on the numerical value obtained by demodulating other data characters in the bar code with the demodulation unit, and infers data coded into the data character not modulated by the demodulation unit. As a result, demodulated data corresponding to the bar code can be obtained immediately.

[Embodiment 1]

Next, an explanation will be given of a bar code reader according to an embodiment 1 of the present invention.

(Configuration of Bar Code Reader)

Figure 2:
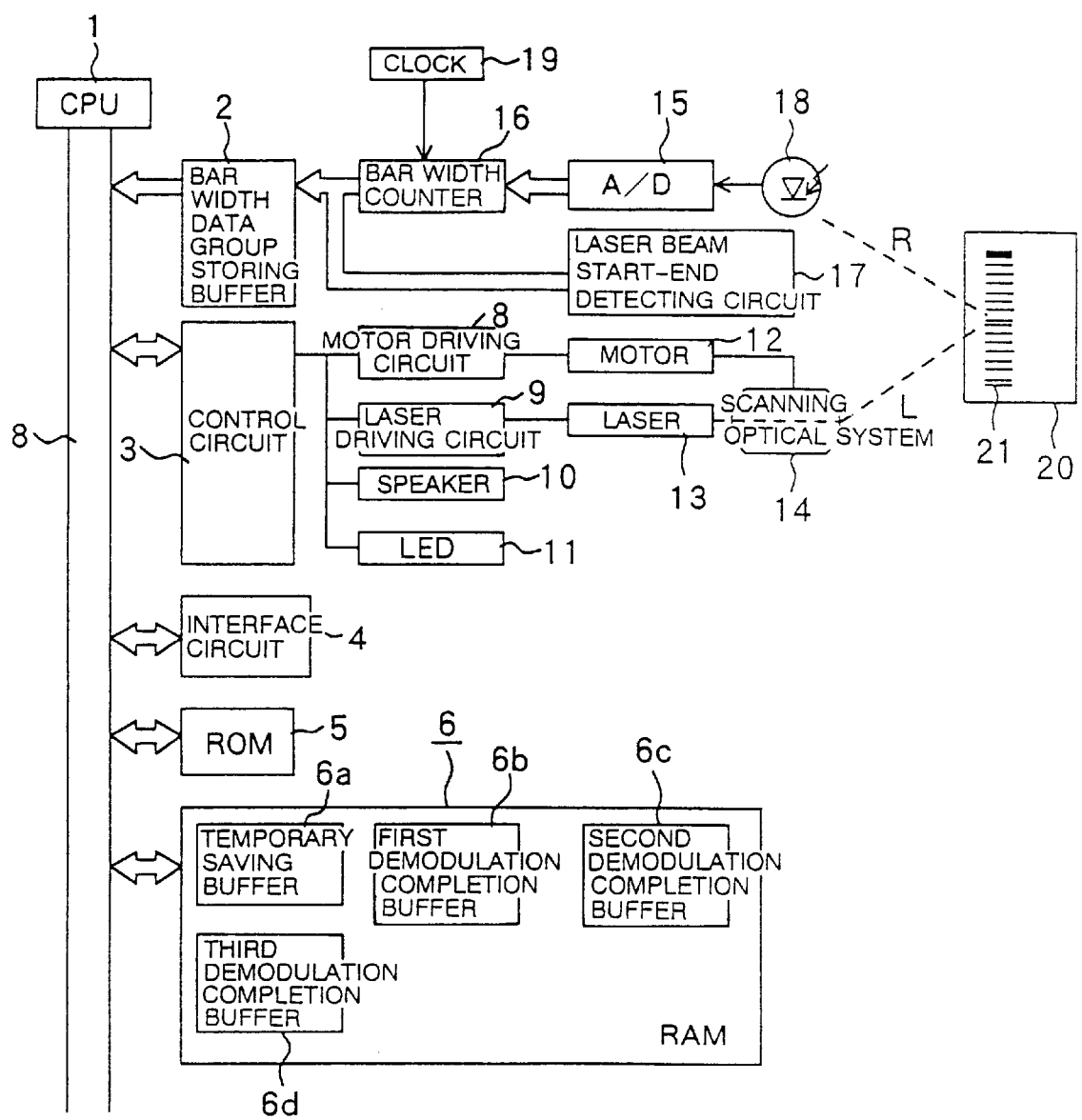
FIG. 2 is a block diagram showing a bar code reader according to an embodiment 1 of the present invention.

FIG. 2 is a block diagram showing an outline configuration of a bar code reader of the embodiment according to the present invention. In FIG. 2, the bar code reader is provided with a CPU 1, a bar width data group storing buffer 2, a control circuit 3, an interface circuit 4, a ROM 5 and a REM 6 connected one another via a bus B, a bar width counter 16 and a leaser beam start-end detecting circuit 17 connected to the bar width data group storing buffer 2, a clock 19 and an A/D converter 15 connected to the bar width counter 16, a light receiving element 18 connected to the A/D converter 15, a motor driving circuit 8, a laser driving circuit 9, a speaker 10 and a LED 11 respectively connected to the control circuit 3, a motor 12 connected to the motor driving circuit 8, a scanning optical system 14 driven by the motor 12, and a semiconductor laser 13 connected to the laser driving circuit 9.

The ROM 5 is a read only memory storing the lists shown in FIGS. 29 and 30 and a bar code recognition/demodulation process program.

The CPU 1 executes the bar code recognition/demodulation process program stored in the ROM 5, thereby controlling all over the bar code reader and functioning as the demodulation unit, the data inference unit, the parity inference unit, the comparison unit and the validation unit so as to demodulate the bar width data obtained by reading the bar code 21.

The interface circuit 4 controls the status of the bus B, and controls data transmission to an external device and so on.

The control circuit 3 controls the motor driving circuit 8, the laser driving circuit 9, the speaker 10, and the light emitting diode (LED) 11. This motor driving circuit 8 drives the motor 12 so as to rotate a polygon mirror not shown in the scanning optical system 14. The laser driving circuit 9 drives the semiconductor laser 13 so that a laser beam L outgoes. The speaker 10 produces a voice indicating the completion of bar code reading (demodulating). The light emitting diode 11 is an indicating element indicating information such as a price of a item 20 obtained as a result of demodulation of the bar code.

The laser beam L outgoing from the semiconductor laser 13 is incident into the scanning optical system 14, and is deflected by the scanning optical system 14. That is, the scanning optical system 14 deflects the laser beam L in one direction with the not shown polygon mirror rotated by the motor 12. At the opposite side of the polygon mirror, several mirrors are fixed. Accordingly, the laser beam L deflected by the polygon mirror is reflected again by each fixed mirror, whereby the deflection direction (scanning direction) is changed into various directions. In the scanning optical system 14, laser beam scanning in plural directions is continuously performed at a high-speed in the deflection cycle by one reflective surface of the polygon mirror. Hereinafter, each laser beam scanning performed in the deflection cycle by one reflective surface of the polygon mirror is called "one scanning".

When the laser beam L scanned in this way hits the surface (including the bar code 21) of the item 20, the laser beam L is irregularly reflected at the surface and a part of the reflected light R is received by the light receiving element (photo diode) 18. The A/D converter 15 compares the fixed threshold value with the current value indicating the light and shade of the reflected light R received by the light receiving element 18, and converts the current value into a binary signal. The binary signal indicates "H" when the strength of the reflected light R corresponds to the reflectance ratio of the black bar in the bar code 21, and indicates "L" when the strength of the reflected R corresponds to the reflectance ratio of the white bar in the bar code 21.

The bar width counter 16, based on the binary signal inputted from the A/D converter 15, measures a time from the rising timing to the falling timing of the binary signal (expected to correspond to the width of the black bar in the bar code 21) and measures a time from the falling timing to the rising timing of the binary signal (expected to correspond to the width of the white bar in the bar code 21). In addition, the bar width counter 16 counts the clock number from the clock 19 in order to measure the time corresponding to these bar widths. Then, the bar width counter 16 outputs 16-bit bar width data shown in FIG. 3 every bar.

In FIG. 3, 11-digits from the first bit to the tenth bit (BCD 0 through BCD 10) show count values indicating bar widths, the eleventh bit (W/B) shows the color of the bar (1=white/0=black), the twelfth bit (WERR) shows a presence of errors (1=error being/0=no error). The thirteenth bit (CHR-F) becomes "1" when a black bar is detected in the pattern which may be the start guard bar, or when a white bar is detected in the pattern which may be the start guard bar. Similarly, the 14th bit (CHR-L) becomes "1" when a white bar is detected in the pattern which may be the end guard bar. The 15th bit (C128) is an identification flag.

The bar width counter 16 continuously outputs such bar width data every scanning of the laser beam. The bar width data continuously outputted every scanning is called "bar width data group".

The control circuit 3, the motor driving circuit 8, the motor 12, the laser driving circuit 9, the semiconductor laser 13, the scanning optical system 14, the light receiving element 18, the A/D converter 15, the bar width counter 16 and the clock 19 are equivalent to the bar width pattern detection unit.

The bar width data group outputted from the bar width counter 16 is inputted into the laser beam start-end detecting circuit 17. The laser beam start-end detecting circuit 17 inspects the status of the bar width data group and detects the scanning start point and the scanning end point of the laser beam in one scanning, and adds information indicating the start point and the end point to the bar width data group.

The bar width data group to which the information indicating the scanning start point and the scanning end point of the laser beam is added is temporarily stored in the bar width data group storing buffer 2. The bar width data group storing buffer 2 sequentially stores the bar width data group inputted from the bar width counter 16 and transfers to the CPU 1 with the bar width data group in order of storing one by one in response to a request from the CPU 1.

In the REM 6, in addition to that a working area for the CPU 1 is developed, the CPU 1 executes the bar code recognition/demodulation process program, whereby a temporary saving buffer 6a, a first demodulation completion buffer 6b, a second demodulation completion buffer 6c and a third demodulation completion buffer 6d are developed.

The temporary saving buffer 6a, while the bar code recognition/demodulation process for each bar width data group is executed, temporarily saves the data (demodulated data) obtained as a result of the process. The format of the demodulated data saved in the temporary saving buffer 6a is explained with reference to FIGS. 4 through 6.

Figure 4:
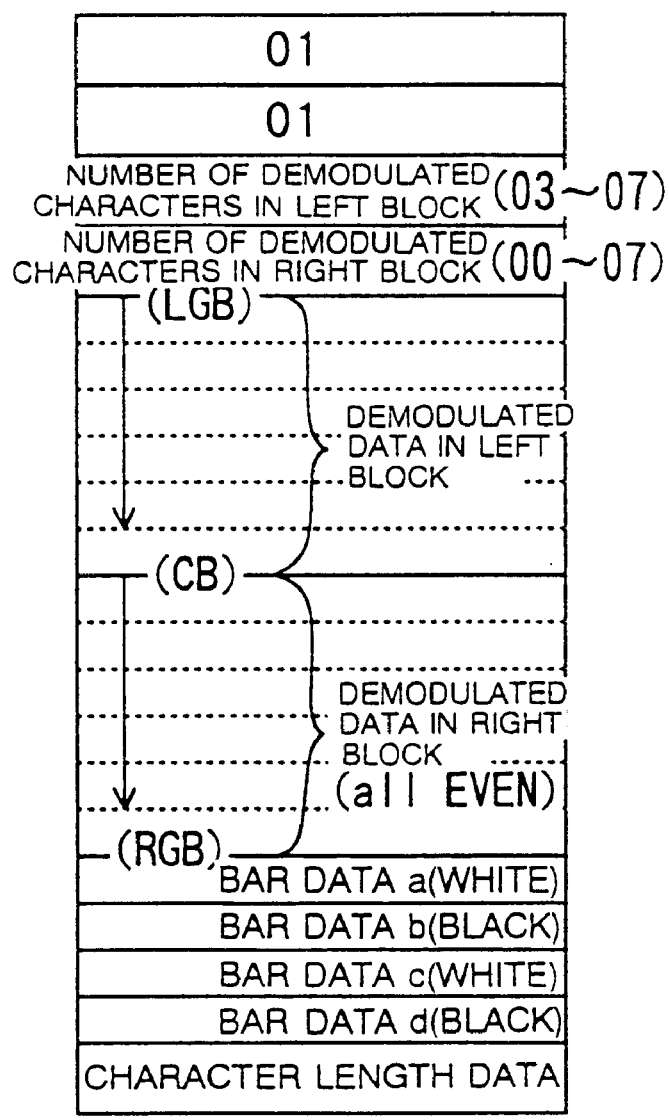
FIG. 4 is a view showing a structure of demodulated data formed in a temporary saving buffer after detecting a pseudo start guard bar.

FIG. 4 shows the data format when the bar code 21 is scanned from the start guard bar as starting point (the scanning is called "continuous reading" when the bar code is read from the start guard bar to the end guard bar at a time). As shown in FIG. 4, the data format in this case, in sequence from the top, is provided with an area showing classification of the demodulated data (showing demodulated data of the 13-digit bar code in a case of "01"), an area showing a retrieval direction (showing that the start guard bar is included in a case of "01"), an area showing the character number of the demodulated data in the left data block, an area showing the character number of the demodulated data in the right data block, an area storing demodulated data in the left data block, an area storing demodulated data in the right data block, an area storing four pieces of bar width data to be a data character firstly failing in demodulation, and an area storing a character length of a data character immediately before the data character firstly failing in demodulation (at the side of the start guard bar).

Figure 5:
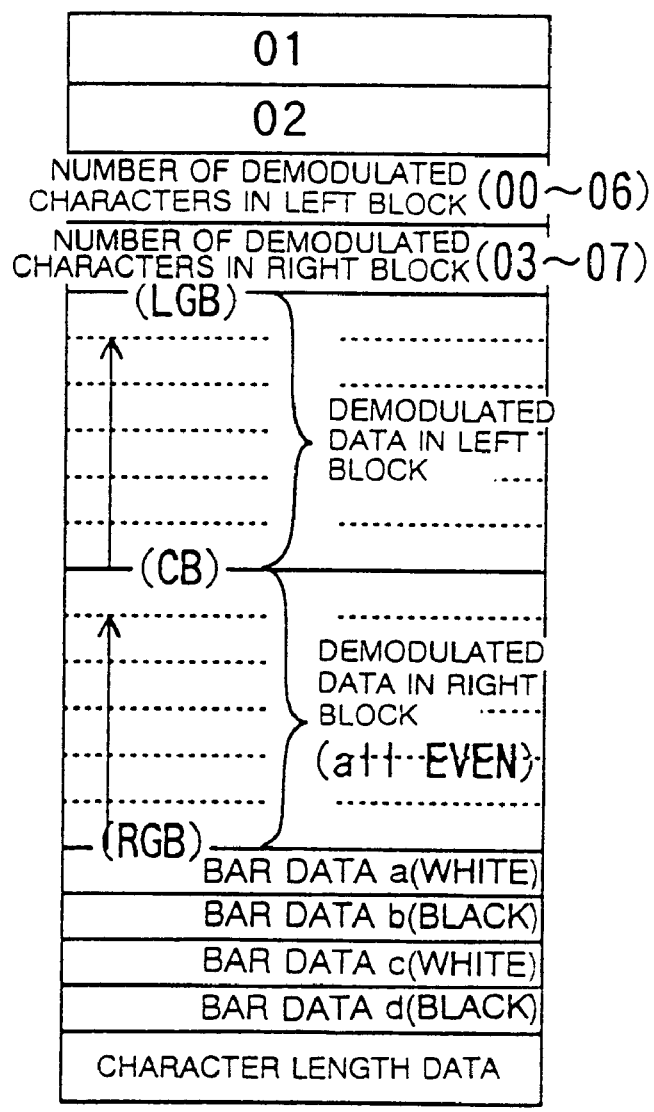
FIG. 5 is a view showing a structure of demodulated data formed in a temporary saving buffer after detecting a pseudo end guard bar.

FIG. 5 shows a data format when the bar code 21 is scanned from the end guard bar as starting point. As shown in FIG. 5, the data format in this case, in sequence from the top, is provided with an area showing classification of the demodulated data (showing demodulated data of the 13-digit bar code in a case of "01"), an area showing a retrieval direction (showing that the end guard bar is included but the start guard bar in a case of "02"), an area showing the number of characters of the demodulated data in the left data block, an area showing the number of characters of the demodulated data in the right data block, an area storing demodulated data in the left data block, an area storing demodulated data in the right data block, an area storing four pieces of bar width data to be a data character firstly failing in demodulation, and an area storing a character length of a data character immediately before the data character firstly failing in demodulation (at the side of the end guard bar).

Figure 6:
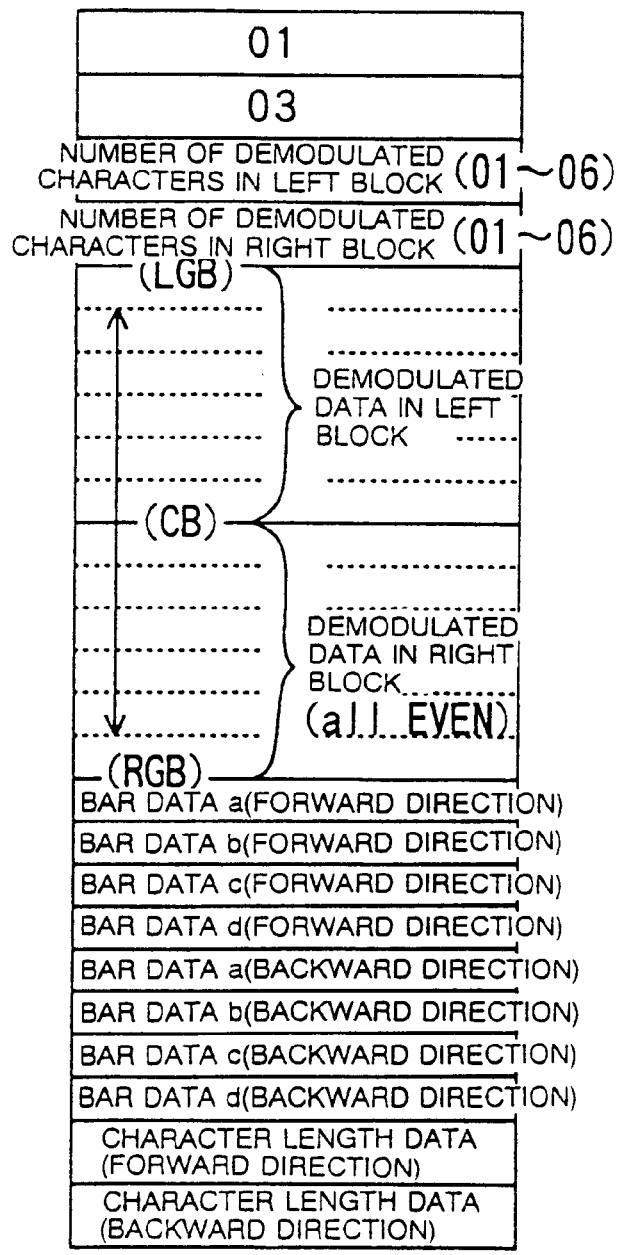
FIG. 6 is a view showing a structure of demodulated data formed in a temporary saving buffer after detecting a pseudo center guard bar.

FIG. 6 shows a data format when the bar code 21 is scanned over front and back of the center bar. As shown in FIG. 6, the data format in this case, in sequence from the top, is provided with an area showing classification of the demodulated data (showing demodulated data of the 13-digit bar code in a case of "01"), an area showing a retrieval direction (showing that only the center bar is included in a case of "03"), an area showing the number of characters of the demodulated data in the left data block, an area showing the number of characters of demodulated data in the right data block, an area storing demodulated data in the left data block, an area storing demodulated data in the right data block, an area storing four pieces of bar width data to be a data character firstly failing in demodulation in the right data block (in the forward direction), an area storing four pieces of bar width data to be a data character firstly failing in demodulation in the left data block (in the backward direction), an area storing a character length of a data character immediately before the data character firstly failing in demodulation (at the side of the end guard bar) in the right data block (in the forward direction), and an area storing a character length of a data character immediately before the data character firstly failing in demodulation (at the side of the center bar) in the left data block (in the backward direction).

The first demodulation completion buffer 6b, when demodulated data shown in FIG. 4 is obtained as a result of execution of the bar code recognition/demodulation process for one bar width data group, stores the demodulated data, and is structured as shown in FIG. 7.

Figure 8:
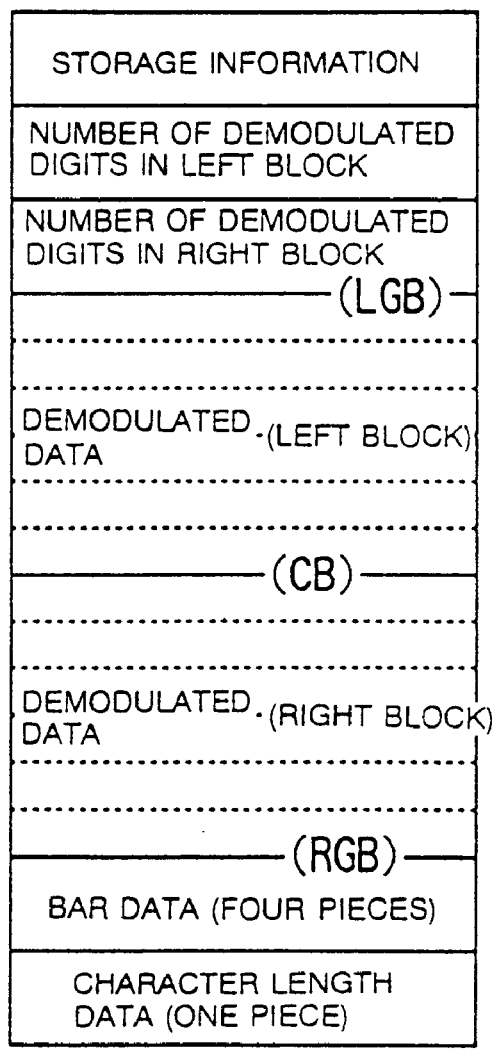
FIG. 8 is a structural view showing a second demodulation completion buffer.

The second demodulation completion buffer 6c, when demodulated data shown in FIG. 5 is obtained as a result of execution of the bar code recognition/demodulation process for one bar width data group, stores the demodulated data, and is structured as shown in FIG. 8.

Figure 9:
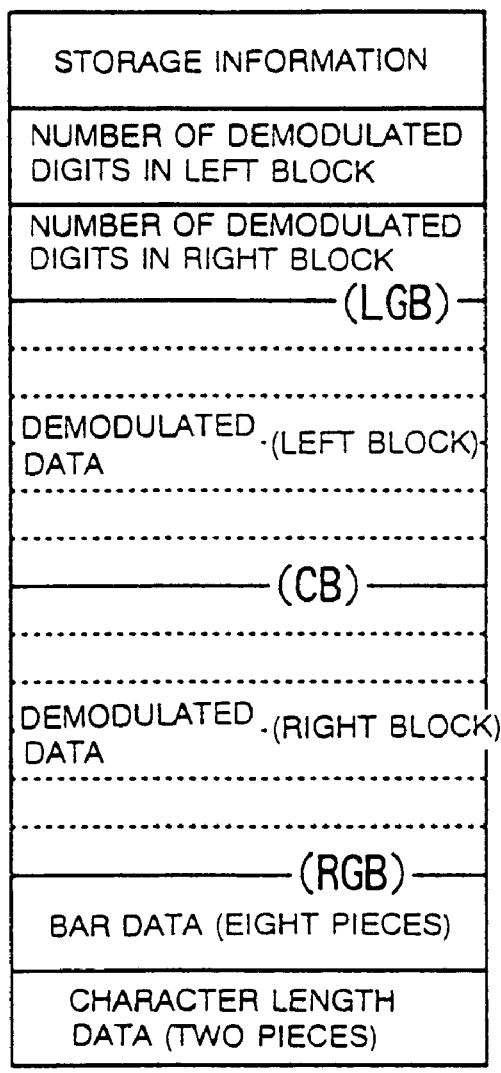
FIG. 9 is a structural view showing a third demodulation completion buffer.

The third demodulation completion buffer 6d, when demodulated data shown in FIG. 6 is obtained as a result of execution of the bar code recognition/demodulation process for one bar width data group, stores the demodulated data, and is structured as shown in FIG. 9.

(Bar Code Recognition/Demodulation Process)

Next, concrete explanations will be given of the bar code recognition/demodulation process program stored in the ROM 5 and executed by the CPU 1 with reference to flowcharts shown in FIGS. 10 through 27.

Figure 10:
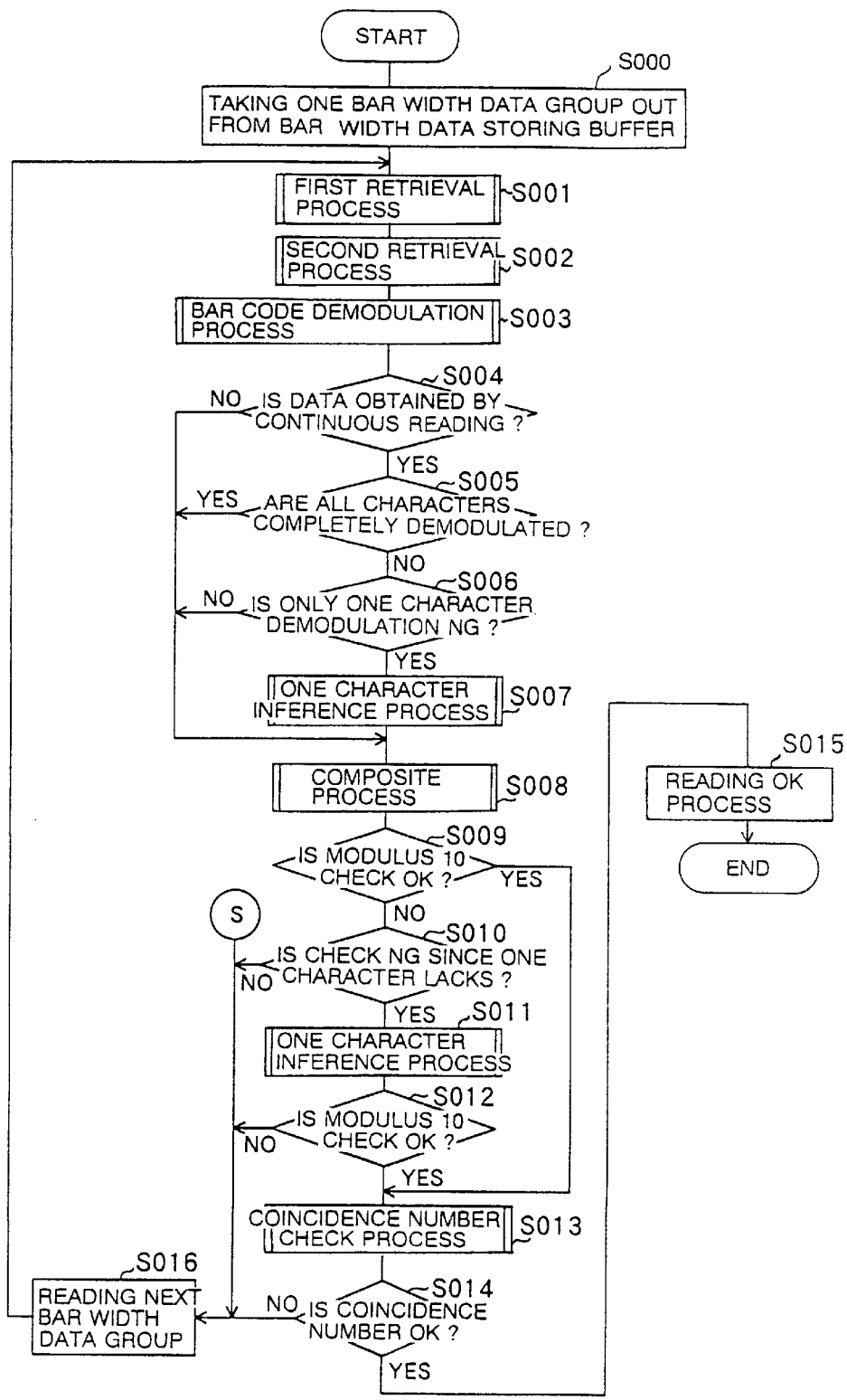
FIG. 10 is a flowchart showing a bar code recognition/demodulation process program executed in the CPU shown in FIG. 2.

The flowchart in FIG. 10 which is the main routine of the bar code recognition/demodulation process starts by supplying a main power source to the bar code reader and by storing the bar width data group in the bar width data group storing buffer 2. In the first S000, the CPU 1 takes out one oldest bar width data group from the bar width data group storing buffer 2.

Figure 11:
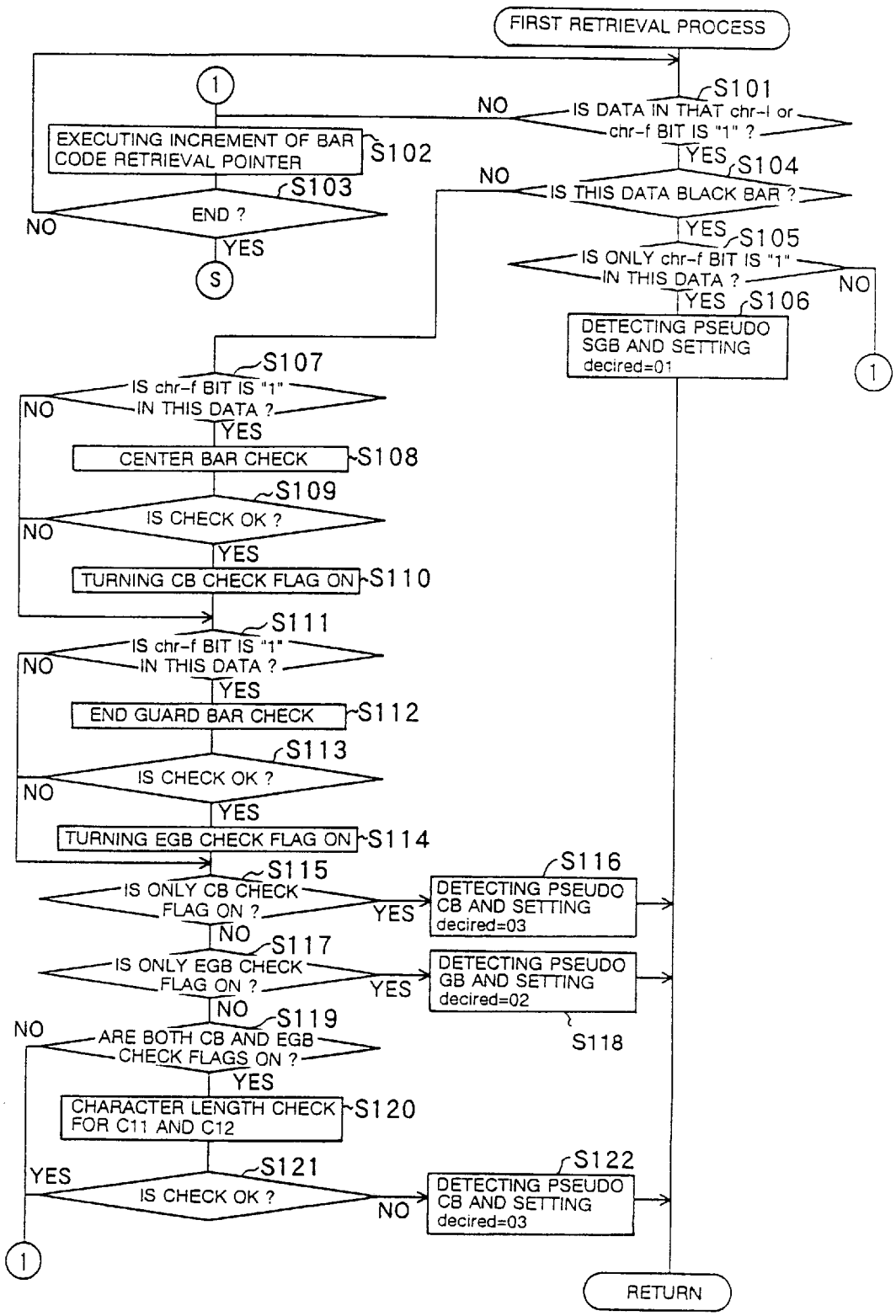
FIG. 11 is a flowchart showing a first retrieval process subroutine executed in S001 shown in FIG. 10.

In the next S001, the CPU 1 executes the first retrieval process obtaining roughly a demodulation start position (namely, a guard bar or a center bar in any one of bar width data) for the bar width data group taken out in the S000 (or S016). FIG. 11 is a flowchart showing the first retrieval process subroutine executed in the S001.

The CPU 1, after entering the subroutine, firstly executes a loop process of S101 through S103 so as to retrieve bar width data of which the CHR-L bit or the CHR-F bit is "1" among the bar width data group to be processed. In addition, the CPU 1 sets a bar code retrieval pointer showing a position of bar width data to be detected at the top of the bar width data group to be processed when executing the loop process at first.

In the first S101 after entering the loop, the CPU 1 checks whether the CHR-L bit or CHR-F bit in the bar width data indicated by the bar code retrieval pointer is "1" or not. The CPU 1 advances the process to S102 when the CHR-L bit and the CHR-F bit in the bar width data are "0".

In the S102, the CPU 1 executes increment of the bar code retrieval pointer so that the next bar width data is indicated. In the next S103, the CPU 1 checks whether there is an undetected bar width data or not (whether the bar code retrieval pointer exceeds the end of the bar width data group to be processed or not). The CPU 1 advances the process to S016 in the main routine in FIG. 10 when there is already no undetected bar width data group. Contrariwise, the CPU 1 returns the process to S101 when there is still an undetected bar width data group.

On the contrary, the CPU 1 advances the process to the S104 when judging that the CHR-L bit or the CHR-F bit of the bar width data indicated by the bar code retrieval pointer is "1" in the S101.

In the S104, the CPU 1 checks whether the W/B bit of the bar width data indicated by the bar code retrieval pointer shows a black bar or not. The CPU 1 advances the process to the S105 when the W/B bit of the bar width data shows a black bar.

In the S105, the CPU 1 checks whether only the CHR-F bit of the bar width data is "1" or not. Then, the CPU 1 judges that an operational mistake of the bar width counter 16 occurs, and advances the process to the S102, when the CHR-F bit of the bar width data is "0", or when the CHR-L of the bar width data is "1". Contrariwise, the CPU 1, when the CHR-F bit is "1" and the CHR-L bit is "0"in the bar width data, sets a flag decdirec=01 showing that a pseudo start guard bar (a pattern like a start guard bar) is detected in the S106, and then terminates the first retrieval process subroutine.

On the contrary, the CPU 1 advances the process to the S107 when judging in the S104 that the W/B bit in the bar width data indicated by the bar code retrieval pointer shows a white bar.

In the S107, the CPU 1 checks whether the CHR-F bit in the bar width data indicated by the bar code retrieval pointer is "1" or not. Then, the CPU 1 advances the process to the S111 when the CHR-F bit in the bar width data is "0".

On the other hand, the CPU 1 executes a center bar check in the S108 when the CHR-F bit in the bar width data is "1". The center bar check is a check whether bar widths of five bars (white bar, black bar, white bar, black bar, white bar) detected by the point of time are regular or not. The CPU 1 advances the process to the S111 when the result of the center bar check is failure (NO in the S109). On the other hand, the CPU 1 advances the process to the S111 after turning a "CB check flag" to ON in the S110, when the result of the center bar check is good (YES in the S109).

In the S111, the CPU 1 checks whether the CHR-L bit in the bar width data indicated by the bar code retrieval pointer is "1". Then, the CPU 1 advances the process to the S115 when the CHR-L in the bar width data is "0".

On the contrary, the CPU 1 executes an end guard bar check in the S112 when the CHR-L in the bar width data is "1". The end guard bar check is a check whether a white bar detected immediately before the point of time is provided an enough width as a margin or not. The CPU 1 advances the process to S115 when the result of the end guard bar check is failure (NO in the S113). Contrariwise, the CPU 1 advances the process to the S115 after turning a "EGB check flag" ON in the S114, when the result of the end guard bar check is good (YES in the S113).

In the S115, the CPU 1 checks whether only "CB check flag" is turned ON or not. The CPU 1 sets a flag decdirec=03 showing that a pseudo center bar (a pattern like the center bar) is detected in the S116, and then terminates the first retrieval process subroutine, when only the "CB check flag" is turned ON.

On the other hand, the CPU 1 checks whether only "EGB check flag" is turned ON in the next S117 when judging that only the "CB check flag" is turned ON in the S115. Then, the CPU 1, when only the "EGB check flag" is turned ON, sets a flag decdirec=02 showing that a pseudo end guard bar (a pattern like the end guard bar) is detected in the S118, and then terminates the first retrieval process subroutine.

Further, the CPU 1 checks whether both of "CB check flag" and "EGB check flag" are turned ON in the next S119 when judging that only the "EGB check flag" is turned ON in the S117. The CPU 1 takes that an operational mistake of the bar width 16 produces, and advances the process to the S102 when both check flags are OFF.

On the other hand, the CPU 1 checks character lengths of the eleventh character and the twelfth character in the next S120 when both check flags are turned ON. In other words, the CPU 1, assuming that the end guard bar is detected, checks whether a bar width total of four bars adjacent to the end guard bar and a bar width total of four bars further adjacent to the four bars are in a tolerance as the character length. Then, the CPU 1 advances the process to the S102 when the character lengths of the eleventh character and the twelfth character are in the tolerance (YES in the S121). The CPU 1, when the character length of the eleventh character or the twelfth character is not in the tolerance (NO in the S121), sets a flag decdirec=03 showing that a pseudo center bar (a pattern like the center bar) is detected in S122, and then terminates the first retrieval process subroutine.

Figure 12:
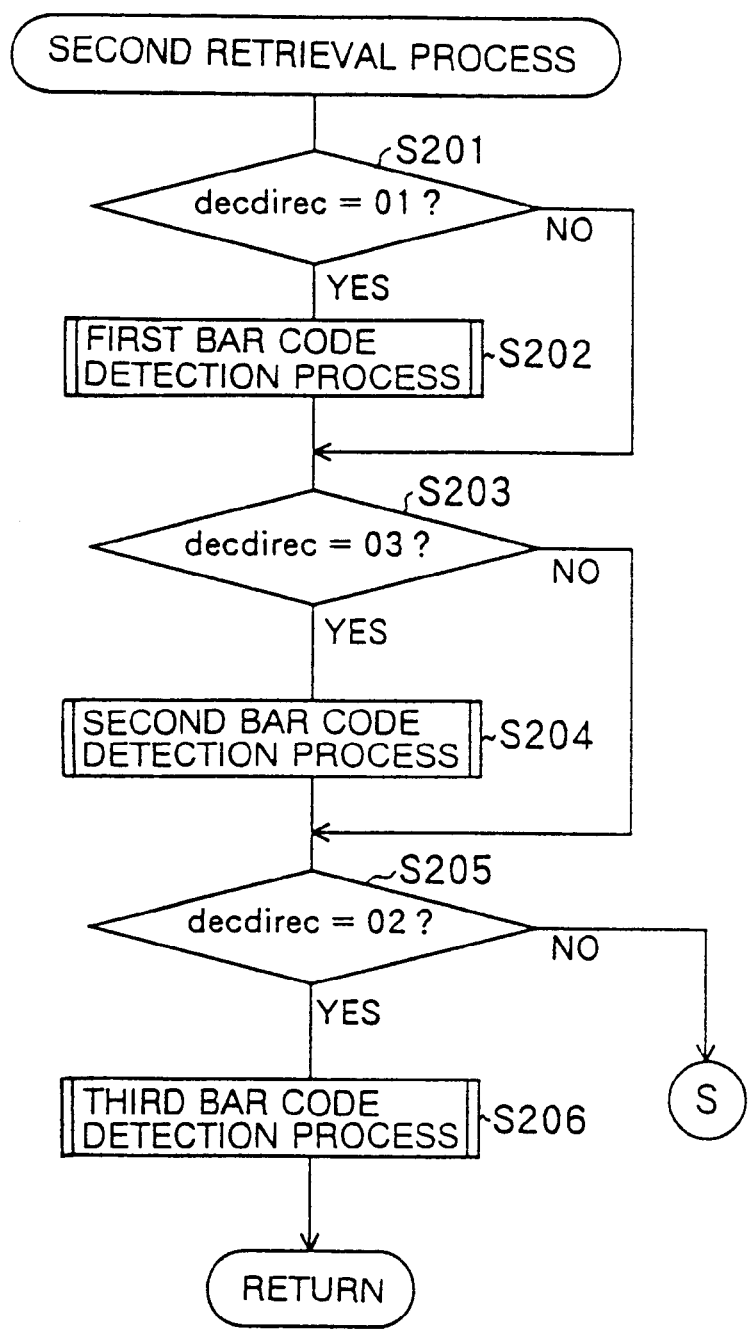
FIG. 12 is a flowchart showing a second retrieval process subroutine executed in S002 shown in FIG. 10.

In the main routine shown in FIG. 10 to which the process is returned from the first retrieval process subroutine, the CPU 1 executes the second retrieval process in the next S002. FIG. 12 is a flowchart showing the second retrieval process subroutine executed in the S002.

Figure 13:
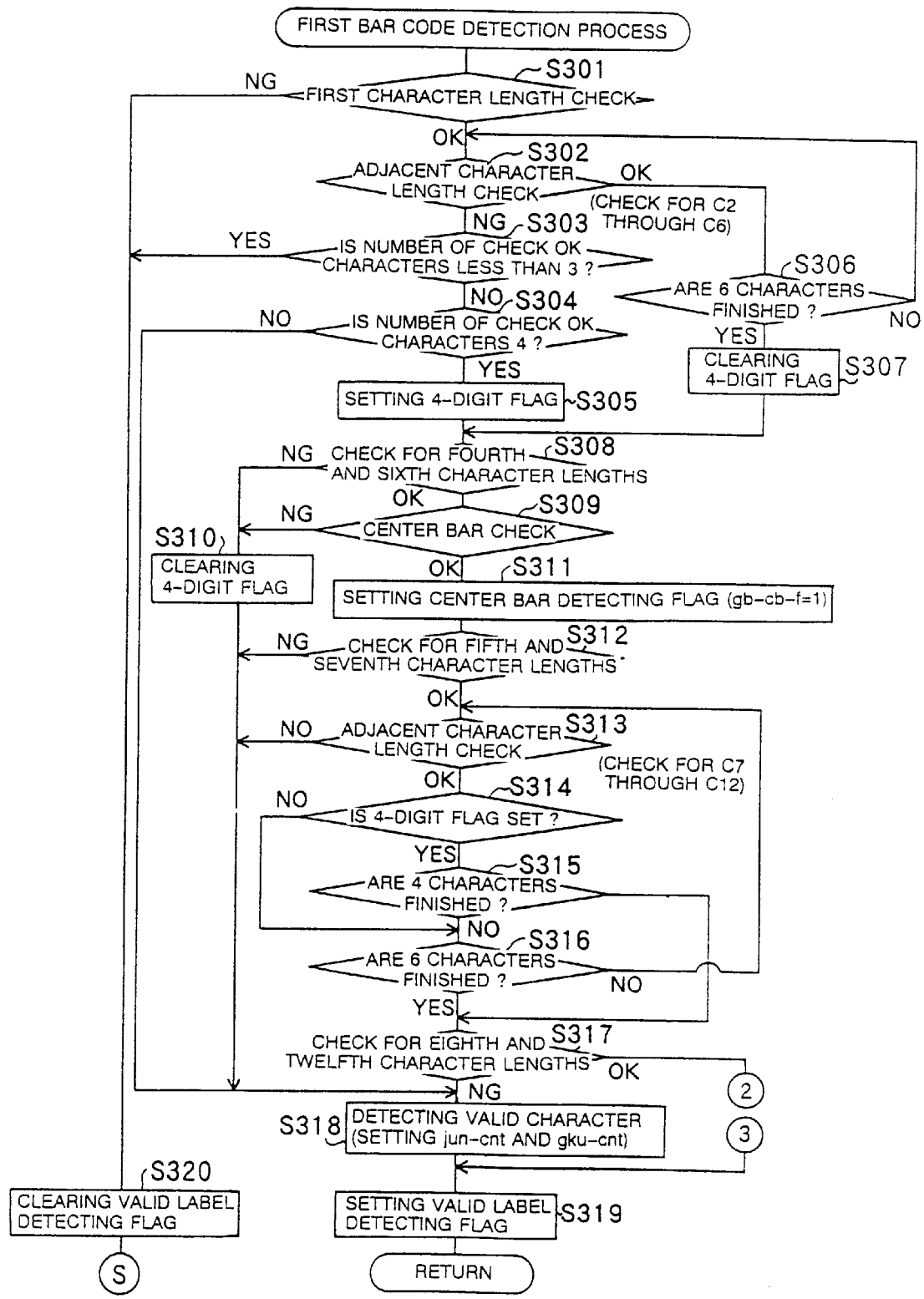
FIG. 13 is a flowchart showing a first bar code detection process subroutine executed in S202 shown in FIG. 12.
Figure 14:
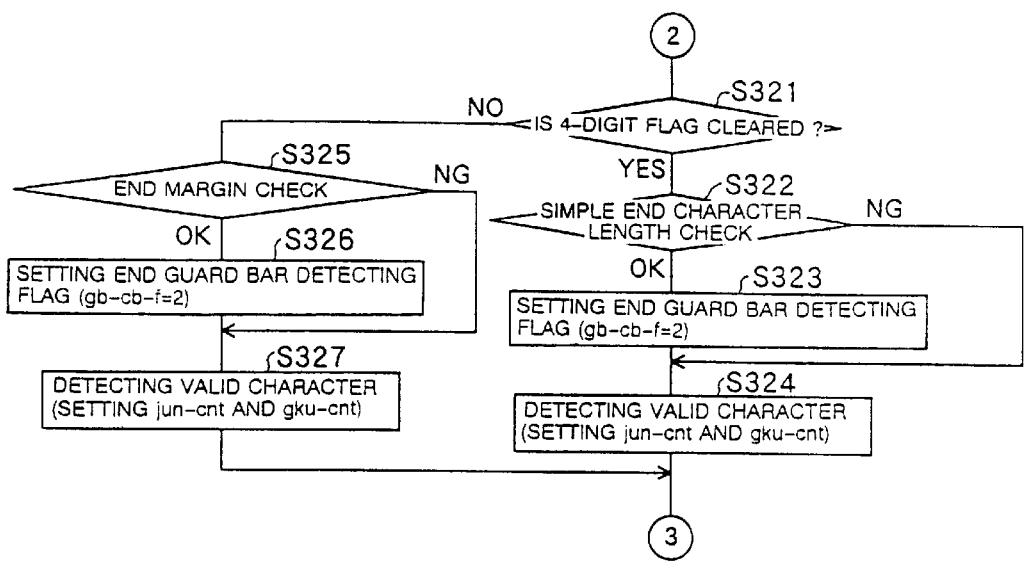
FIG. 14 is a flowchart showing a first bar code detection process subroutine executed in S202 shown in FIG. 12.

The CPU 1, in the first S201 after entering this subroutine, checks whether the flag decrirec is set with "01" or not. The CPU 1 advances the process to the S203 when the flag decrirec is not set with "01". Contrariwise, the CPU 1 executes the first bar code detection process which is a bar code retrieval process after detecting the pseudo start guard bar in the S202, when the flag decrirec is set with "01". FIGS. 13 and 14 are flowcharts showing the first bar code retrieval process subroutine executed in the S202.

The CPU 1, in the first S301 after entering this subroutine, checks the length of the first character continuous to the pseudo start guard bar. In other words, the CPU 1 checks whether a total of bar width count values of four characters to be the first character becomes around a fixed value or not. The CPU 1, when the length of the first character is not around the fixed value, takes that the bar width data group to be processed is a data group based on a design except the bar code, clears a "valid label detecting flag", and then advances the process to the S016 in the main routine shown in FIG. 10. On the other hand, the CPU 1 advances the process to the S302, when the length of the first character is around the fixed value.

In the S302, the CPU 1 checks the length of the adjacent character (the second character adjacent to the first character initially). The CPU 1 advances the process to the S306 when the length of this character is around the fixed value.

In the S306, the CPU 1 checks whether the character length check for 6 characters is completed in the S301 and the S302 by this point of time. The CPU 1 returns the process to the S302 when the character length check for 6 characters is not yet completed. On the contrary, the CPU 1 advances the process to the S308 after clearing "4-digit flag" in the S307, when the character length check for 6 characters is already completed.

The CPU 1, in the S303, checks whether the number of characters judged as the character length is around the fixed value in the S301 and the S302 is less than three or not, when judging that the length of the adjacent character is not around the fixed value in the S 302. The CPU 1, when the number of characters judged as the character length is around the fixed value is less than three, takes that the reliability of the bar width data group to be processed is low, and then clears the "valid label detecting flag" in the S320, thereafter, advances the process to the S016 in the main routine shown in FIG. 10.

On the other hand, the CPU 1, when the number of character judged as the character length is around the fixed value is three or more, in the S304, checks whether the number of characters judged as the character length is around the fixed value in the S301 and the S302 is four or not. The CPU 1 advances the process to the S318 when the number of characters judged as the character length is around the fixed value is not four.

The CPU 1, when the number of characters judged as the character length is around the fixed value is 4, advances the process to the S308 after setting a "four-digit flag" in the S305.

In the S308, the CPU 1 checks again the length of the fourth character (when "four-digit flag" is set) or the sixth character (when "four-digit flag" is cleared). Then, the CPU 1, when the length of the fourth character or the sixth character is around the fixed value, advances the process to the S318 after clearing the "four-digit flag" in the S310 (skipping the S310 when already cleared).

On the other hand, the CPU 1 executes the center bar check in the S309 when the length of the fourth character or the sixth character is around the fixed value. The center bar check is a check whether five bars adjacent to the fourth character (when "four-digit flag" is set) or the sixth character (when "four-digit flag" is cleared) is coincide with a pattern predetermined as the center bar (a pattern in which each bar width is 1 module length). The CPU 1 advances the process to the S318 after clearing the "four-digit flag" in the S310 when the result of the center bar check is failure (NG).

Further, the CPU 1 sets a "center bar detection flag" in the S311 when the result of the center bar check is good (OK). That is, the flag gb-cb-f is set to "1".

In the next S312, the CPU 1 checks the length of the fifth character adjacent to the center bar (when "four-digit flag is set) or the seventh character (when "four-digit flag" is cleared). The CPU 1 advances the process to the S318 when the length of the fifth character or the seventh character is around the fixed value. On the other hand, the CPU 1 advances the process to the S313 when the length of the fifth character or the seventh character is around the fixed value.

In the S313, the CPU 1 checks the length of the adjacent character (the sixth character adjacent to the fifth character, or the eighth character adjacent to the seventh character initially). The CPU 1 advances the process to the S314 when the length of this character is around the fixed value.

In the S314, the CPU 1 checks whether the "four-digit flag" is set or not. The CPU 1 advances the process to the S316 when the "four-digit flag" is cleared. Contrariwise, the CPU 1, in the S315, checks whether the character length check for 4 characters is completed in the S312 and the S313 by this point of time, when the "four-digit flag" is set. Then, the CPU 1 advances the process to the S316 when the character length check for 4 characters is not yet completed. Alternately, the CPU 1 advances the process to the S317 when the character length check of 4 characters is already completed.

In the S316, the CPU 1 checks whether the character length check for 6 characters is completed in the S312 and the S313 by this point of time. The CPU 1 returns the process to the S313 when the character length check for 6 characters is not yet completed. On the contrary, the CPU 1 advances the process to the S317 when the character length check for 6 characters is already completed.

In the S317, the CPU 1 checks again the length of the eighth character (when the "four-digit flag" is set) or the twelfth character (when "four-digit flag" is cleared). The CPU 1 advances the process to the S318 when the length of the eighth character or the twelfth character is not around the fixed value, and advances the process to the S321 when the length of the eighth character or the twelfth character is around the fixed value.

In the S318, the CPU 1 executes a valid character number detection process. In this valid character number detection process, the CPU 1 sets to a counter jun-cnt with the number of characters to be the left block judged as the character length is around the fixed value in the S301, the S302, and the S308, and sets to a counter gku-cnt with the number of characters to be the right block judged as the character length is around the fixed value in the S312, the S313, and the S317. After completion of this valid character number detection process, the CPU 1 advances the process to the S319.

Alternately, in the S321, the CPU 1 checks whether the "four-digit flag" is cleared or not. The CPU 1 advances the process to the S325 when the "four-digit flag" is cleared, and advances the process to the S322 when the "four-digit flag" is set.

In the S322, the CPU 1 executes a simple end character length check. In other words, the CPU 1 checks whether three bars adjacent to the eighth character are coincide with a pattern predetermined as the end guard bar (a pattern in which each bar width is 1 module length) and a white bar adjacent to the three bars is provided with a bar width longer than a length determined as an end margin. Then, the CPU 1 advances the process to the S324 when the result of the simple end character length check is failure (NG). On the contrary, the CPU 1 sets the "end guard bar detection flag" in the S323 when the result of the simple end character length check is good (OK). That is, the flag gb-cb-f is rewritten by "2". The CPU 1 advances the process to the S324 after completing the S323.

In the S324, the CPU 1 executes the above-described valid character number detection process. In other words, the CPU 1 sets to the counter jun-cnt with the number of characters to be the left data block judged as the character length is around the fixed value in the S301, the S302, and the S308, and sets to the counter gku-cnt with the number of characters to be the right data block judged as the character length is around the fixed value in the S312, the S313, and the S317. After completing this valid character number detection process, the CPU 1 advances the process to the S319.

Alternately, in the S325, the CPU 1 executes the end margin check. In other words, the CPU 1 checks whether three bars adjacent to the twelfth character are coincide with a pattern predetermined as the end guard bar (a pattern in which each bar width is 1 module length), and a white bar adjacent to these three bars is provided with a bar width longer than a length determined as the end margin. The CPU 1 advances the process to the S327 when the result of the end margin check is failure (NG). On the contrary, the CPU 1 sets the "end guard bar detection flag" in the S326 when the result of the end margin check is good (OK). That is, the flag gb-cb-f is rewritten by "2". The CPU 1 advances the process to the S327 after completing this S326.

In the S327, the CPU 1 executes the above-described valid character number detection process. In other words, the CPU 1 sets to the counter jun-cnt with the number of characters to be the left data block judged as the character length is around the fixed value in the S301, the S302, and the S308, and sets to the counter gku-cnt with the number of characters to be the right data block judged as the character length is around the fixed value in the S312, the S313, and the S317. After completing this valid character number detection process, the CPU 1 advances the process to the S319.

In the S319, the CPU 1 sets the "valid label detection flag". Thereafter, the CPU 1 terminates the first bar code detection process routine, and returns the process to the second retrieval process routine shown in FIG. 12. In the second retrieval process routine, the CPU 1 advances the process to the S203 after completing the S202.

Figure 15:
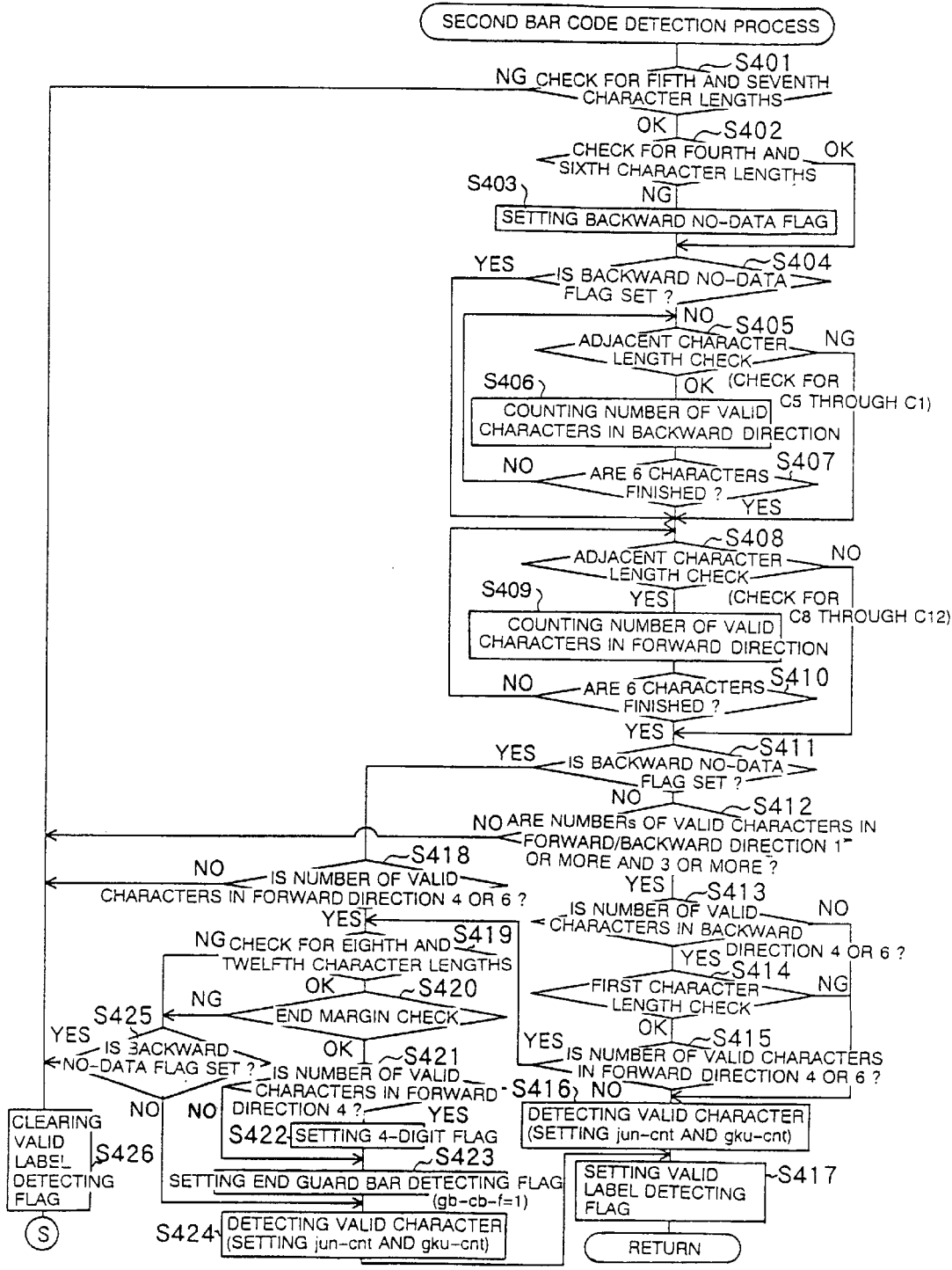
FIG. 15 is a flowchart showing a second bar code detection process subroutine executed in S204 shown in FIG. 12.

In the S203, the CPU 1 checks whether the flag decrirec is set with "03" or not. The CPU 1 advances the process to the S205 when the flag decrirec is not set with "03". The CPU 1 executes the second bar code detection process which is a bar code retrieval process after detecting the pseudo center bar detection in the S204 when the flag decrirec is set to "03". FIG. 15 is a flowchart showing the second bar code retrieval process subroutine executed in the S204.

The CPU 1, in the first S401 after entering this subroutine, checks the length of the character adjacent to the pseudo center bar in the forward direction (the fifth character in a case of a 8-digit bar code, the seventh character in a case of a 13-digit bar code).

The CPU 1, when the length of the fifth character or the seventh character is not around the fixed value, takes that reliability of the bar width data group to be processed is low, and clears the "valid label detection flag" in the S426, thereafter, advances the process to the S016 in the main routine shown in FIG. 5. On the other hand, the CPU 1 advances the process to the S402 when the length of the fifth character or the seventh character is around the fixed value.

In the S402, the CPU 1 checks the length of the character adjacent to the pseudo center guard bar in the backward direction (the fourth character in a case of the 8-digit bar code, the sixth character in a case of the 13-digit bar code). The CPU 1 advances the process to the S404 when the length of the fourth character or the sixth character is around the fixed value. On the other hand, the CPU 1 sets a "backward direction no-data flag" in the S403, and then advances the process to the S404 when the length of the fourth character or the sixth character is not around the fixed value.

In the S404, the CPU 1 checks whether the "backward direction no-data flag" is set or not. The CPU 1 advances the process to the S408 when the "backward direction no-data flag" is set. On the contrary, the CPU 1 advances the process to the S405 when the "backward direction no-data flag" is not set.

In the S405, the CPU 1 checks the length of the character adjacent to the fourth character or the sixth character in the backward direction (initially, the third character adjacent to the fourth character, or the fifth character adjacent to the sixth character). Then, the CPU 1 advances the process to the S406 when the length of this character is around the fixed value.

In the S406, the CPU 1 counts the number of characters (characters continuing in the backward direction) judged as the character length is around the fixed value in the S402 and the S405 by this point of time.

In the next S407, the CPU 1 checks whether or not the character length check for 6 characters is completed in the S402 and the S405 by this point of time. The CPU 1 returns the process to the S405 when the character length check for 6 characters is not yet completed. On the contrary, the CPU 1 advances the process to the S408 when the character length check for 6 characters is already completed.

Alternately, the CPU 1 advances the process to the S408 when judging that the length of the adjacent character is not around the fixed value in the S405.

In the S408, the CPU 1 checks the length of the character adjacent to the fifth character or the seventh character in the forward direction (initially, the sixth character adjacent to the fifth character, or the eighth character adjacent to the seventh character). The CPU 1 advances the process to the S409 when the length of this character is around the fixed value.

In the S409, the CPU 1 counts the number of the characters (characters continuing in the forward direction) judged as the character length is around the fixed value in the S401 and the S408 by this point of time.

In the next S410, the CPU 1 checks whether or not the character length check for 6 characters is completed in the S401 and the S408 by this point of time. The CPU 1 returns the process to the S408 when the character length check for 6 characters is not yet completed. On the contrary, the CPU 1 advances the process to the S411 when the character length check for 6 characters is already completed.

Alternately, the CPU 1 advances the process to the S411 when judging that the length of the adjacent character is not around the fixed value in the S408.

In the S411, the CPU 1 checks whether the "backward direction no-data flag" is set or not. The CPU 1 advances the process to the S412 when the "backward direction no-data flag" is not set, and advances the process to the S418 when the "backward direction no-data flag" is set.

In the S412, the CPU 1 checks whether or not the number of valid characters in the backward direction counted in the S406 is "1" or more and the number of valid characters in the forward direction counted in the S409 is "3" or more, or, whether or not the number of valid characters in the backward direction counted in the S406 is "3" or more and the number of valid characters in the forward direction counted in the S409 is "1" or more. The CPU 1, when the number of valid characters in any direction is less than "3" and the number of valid characters in one direction is "0", takes that reliability of the bar width data group to be processed is low, and then clears the "effective label detection flag" in the S426, thereafter, advances the process to the S016 in the main routine shown in FIG. 10. Alternately, the CPU 1 advances the process to the S413 when the number of effective characters in one direction is "3" or more and the number of effective characters in another direction is "1" or more.

In the S413, the CPU 1 checks whether the number of the valid characters in the backward direction counted in the S406 is "4 (in a case of eight-digit bar code)" or "6 (in a case of 13-digit bar code)". The CPU 1 advances the process to the S416 when the number of valid characters in the backward direction is not "4" or "6", and advances the process to the S414 when the number of valid characters in the backward direction is "4" or "6".

In the S414, the CPU 1 checks the length of the first character again. The CPU 1 advances the process to the S416 when the length of the first character is not around the fixed value, and advances the process to the S415 when the length of the first character is around the fixed value.

In the S415, the CPU 1 checks whether or not the number of valid characters in the forward direction counted in the S409 is "4 (in a case of 8-digit bar code)" or "6 (in a case of 13-digit bar code)". The CPU 1 advances the process to the S419 when the number of valid characters in the forward direction is "4" or "6", and advances the process to the S416 when the number of valid characters in the forward direction is not "4" or "6".

In the S416, the CPU 1 executes the valid character number detection process. In other words, the CPU 1 sets to the counter gku-cnt with the number of effective characters in the forward direction counted in the S409, and to the counter jun-cnt with the number of valid characters in the backward direction counted in the S406. After completing the valid character number detection process, the CPU 1 sets the "valid label detection flag" in the S317, and then terminates the second bar code detection process routine so as to return to the second retrieval process routine shown in FIG. 12.

On the other hand, in the S418, the CPU 1 checks whether the number of effective characters number in the forward direction counted in the S409 is "4 (in a case of eight-digit bar code)" or "6 (in a case of 13-digit bar code)". The CPU 1, when the number of effective character numbers in the forward direction is not "4" or "6", clears the "valid label detection flag" in the S426, and then advances the process to the S016 in the main routine shown in FIG. 10. Alternately, the CPU 1 advances the process to the S419 when the number of valid characters in the forward direction is "4" or "6".

In the S419, the CPU 1 checks the length of the eighth character (when it is judged that the number of characters in the forward direction is "4" in the S418) or the twelfth character (when it is judged that the number of characters in the forward direction is "6" in the S418) again. The CPU 1 advances the process to the S425 when the length of the eighth character or the twelfth character is not around the fixed value. Alternately, the CPU 1 advances the process to the S420 when the length of the eighth character or the twelfth character is around the fixed value.

In the S420, the CPU 1 executes the end margin check. In other word, the CPU 1 checks whether three bars adjacent to the eighth character (when it is judged that the number of effective characters in the forward direction is "4" in the S418) or the twelfth character (when it is judged that the number of effective characters in the forward direction is "6" in the S418) are coincide with a pattern predetermined as the end guard bar (the pattern in which each bar width is 1 module length), and a white bar adjacent to the three bars is provided with a bar width longer than the length defined as the end guard bar. The CPU 1 advances the process to the S425 when the result of the end margin check is failure (NG). Alternately, the CPU 1 advances the process to the S421 when the result of the end margin check is good (OK).

In the S425, the CPU 1 checks whether the "backward direction no-data flag" is set or not. The CPU 1, when the "backward direction no-data flag" is set, clears the "valid label detection flag" in the S426, and then advances the process to the S016 in the main routine shown in FIG. 10. Alternately, the CPU 1 advances the process to the S424 when the "backward direction no-data flag" is not set.

On the other hand, in the S421, the CPU 1 checks whether the number of effective characters counted in the S409 is "4" or not. The CPU 1 advances the process to the S423 when the number of effective characters is not "4", and advances the process to S423 after setting "four-digit flag" in the S422 when the number of effective characters is "4".

In the S423, the CPU 1 sets the "end guard bar detection flag". That is, the CPU 1 sets "1" to the flag gb-cb-f. Thereafter, the CPU 1 advances the process to the S424.

In the S424, the CPU 1 executes the valid character number detection process. In other words, the CPU 1 sets to the counter gku-cnt with the number of valid characters in the forward direction counted in the S409, and sets to the counter jun-cnt with the number of valid characters in the backward direction counted in the S406. After completing this valid character number detection process, the CPU 1 sets the "valid label detection flag" in the S317, and then terminates the second bar code detection process routine so as to return to the second retrieval process routine shown in FIG. 12.

The CPU 1 advances the process to the S205 when returning to the second retrieval process routine.

Figure 16:
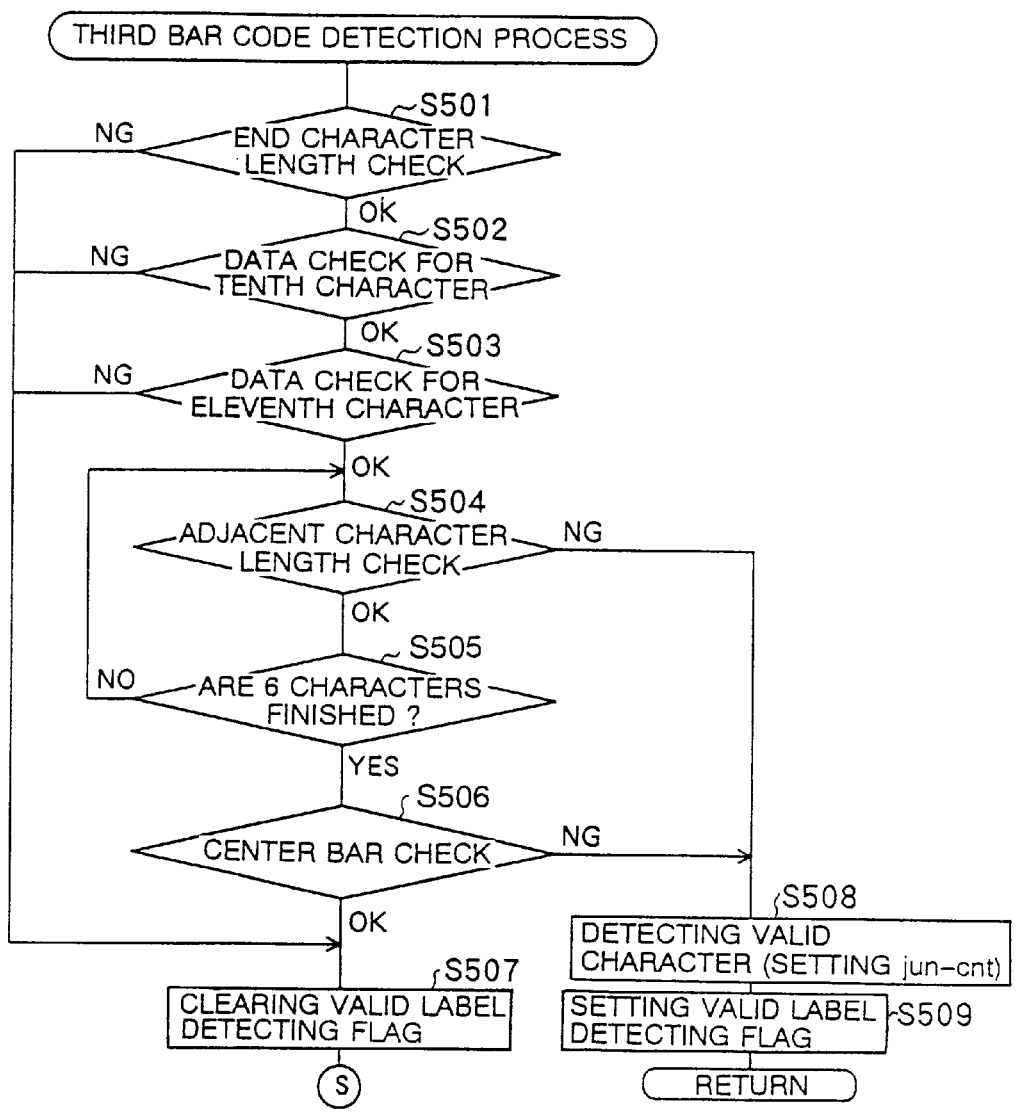
FIG. 16 is a flowchart showing a third bar code detection process subroutine executed in S206 shown in FIG. 12.

In the S205, the CPU 1 checks whether the flag decrirec is set for "02". The CPU 1, when the flag decrirec is not set for "02", takes that an operational mistake produces, and advances the process to the S016 in the main routine shown in FIG. 10. On the contrary, the CPU 1, when the flag decrirec is set for "02", executes the third bar code detection process which is a bar code retrieval process after detecting the pseudo end guard bar in the S206. FIG. 16 is a flowchart showing the third bar code retrieval process subroutine executed in the S206.

In the first S501 after entering this subroutine, the CPU 1 executes the end character length check. In other words, the CPU 1 checks the total of bar widths of four bars adjacent to the pseudo end guard bar. The CPU 1, when the length of the end character is not around the fixed value, takes that reliability of the bar width data group to be processed is low, and then clears the "valid label detection flag" in the S507, thereafter, advances the process to the S016 in the main routine shown in FIG. 10. Alternately, the CPU 1, when the length of the end character is around the fixed value, advances the process to the S502.

In the S502 and the next S503, the CPU 1 checks the lengths of the eleventh character adjacent to the end character and the tenth character. The CPU 1, when the length of the eleventh character or the tenth character is not around the fixed value, takes that reliability of bar width data group to be processed is low, and then clears the "effective label detection flag" in the S507, thereafter, advances the process to the S016 in the main routine shown in FIG. 10. Alternately, the CPU 1 advances the process to the S504 when both lengths of the eleventh character and the tenth character are around the fixed value.

In the S504, the CPU 1 checks the length of the adjacent character (initially, the ninth character adjacent to the tenth character). The CPU 1 advances the process to the S508 when the length of this character is not around the fixed value, and advances the process to the S505 when the length of this character is around the fixed value.

In the S505, the CPU 1 checks whether the character length check for 6 characters is completed in the S501 through the S504 by this point of time. The CPU 1 returns the process to the S504 when the character length check for 6 characters is not yet completed. On the contrary, the CPU 1 advances the process to the S506, when the character length check for 6 characters is already completed.

In the S506, the CPU 1 executes the center bar check. The center bar check is a check whether five bars adjacent to the seventh character are coincide with a pattern determined as the center bar (a pattern in which each bar width is 1 module length). The CPU 1, when the result of the center bar check is good (OK), takes as an impossible status, and then clears the "valid label detection flag", thereafter, advances the process to the S016 in the main routine shown in FIG. 10. On the contrary, the CPU 1 advances the process to the S508 when the result of the center bar check is failure (NG).

In the S508, the CPU 1 executes the valid character number detection process. In other words, the CPU 1 sets to the counter jun-cnt with the number of characters judged as the character length is around the fixed value in the S501 through the S504. After completing this valid character number detection process, the CPU 1 terminates the third bar code detection process subroutine after setting the "valid label detection flag" in the S509, and then returns to the second retrieval process routine shown in FIG. 12.

In the second retrieval process routine, the CPU 1 terminates the second retrieval process routine after the S206, and returns the process to the main routine shown in FIG. 10.

Figure 17:
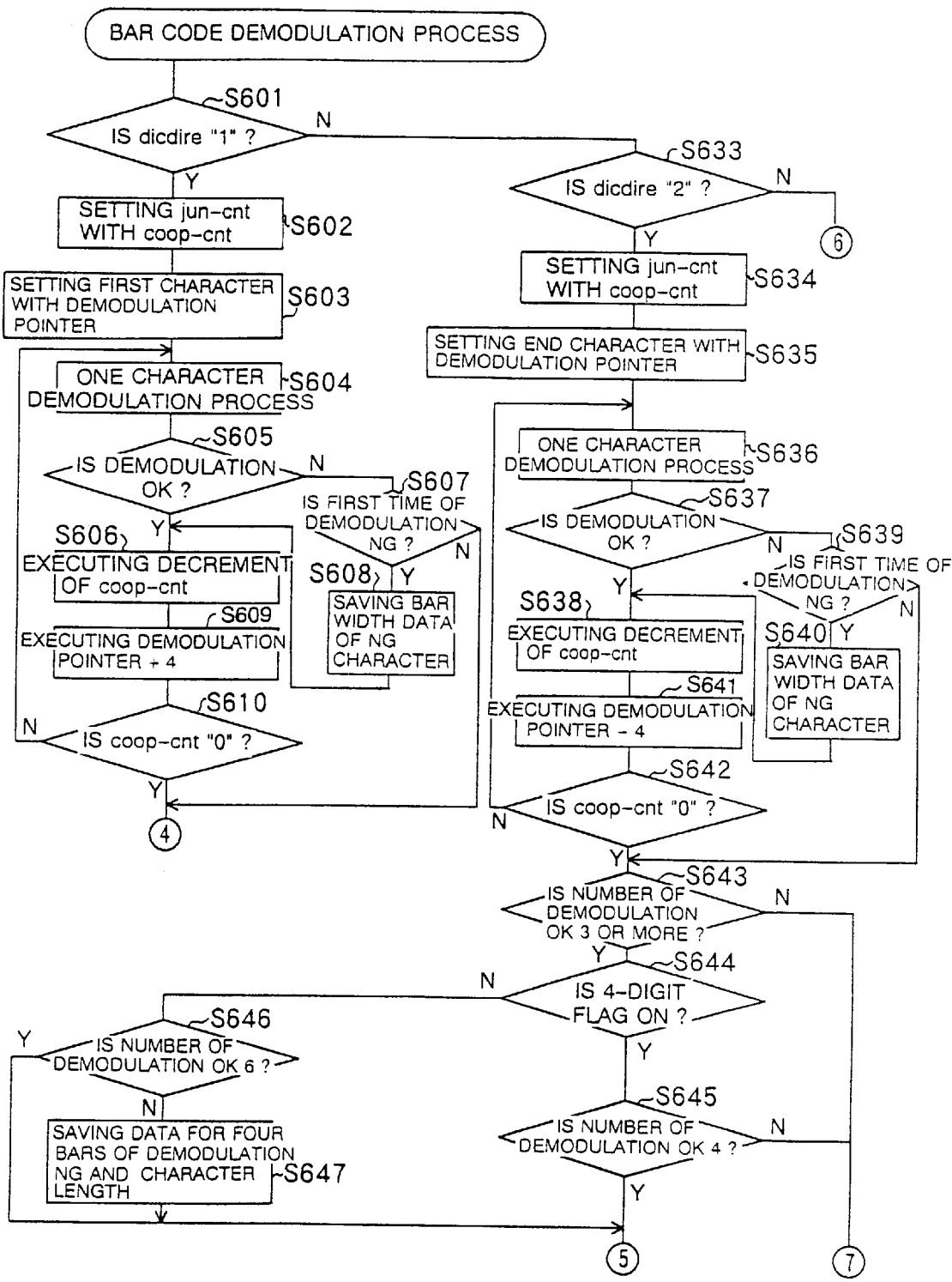
FIG. 17 is a flowchart showing a bar code demodulation process subroutine executed in S003 shown in FIG. 10.
Figure 18:
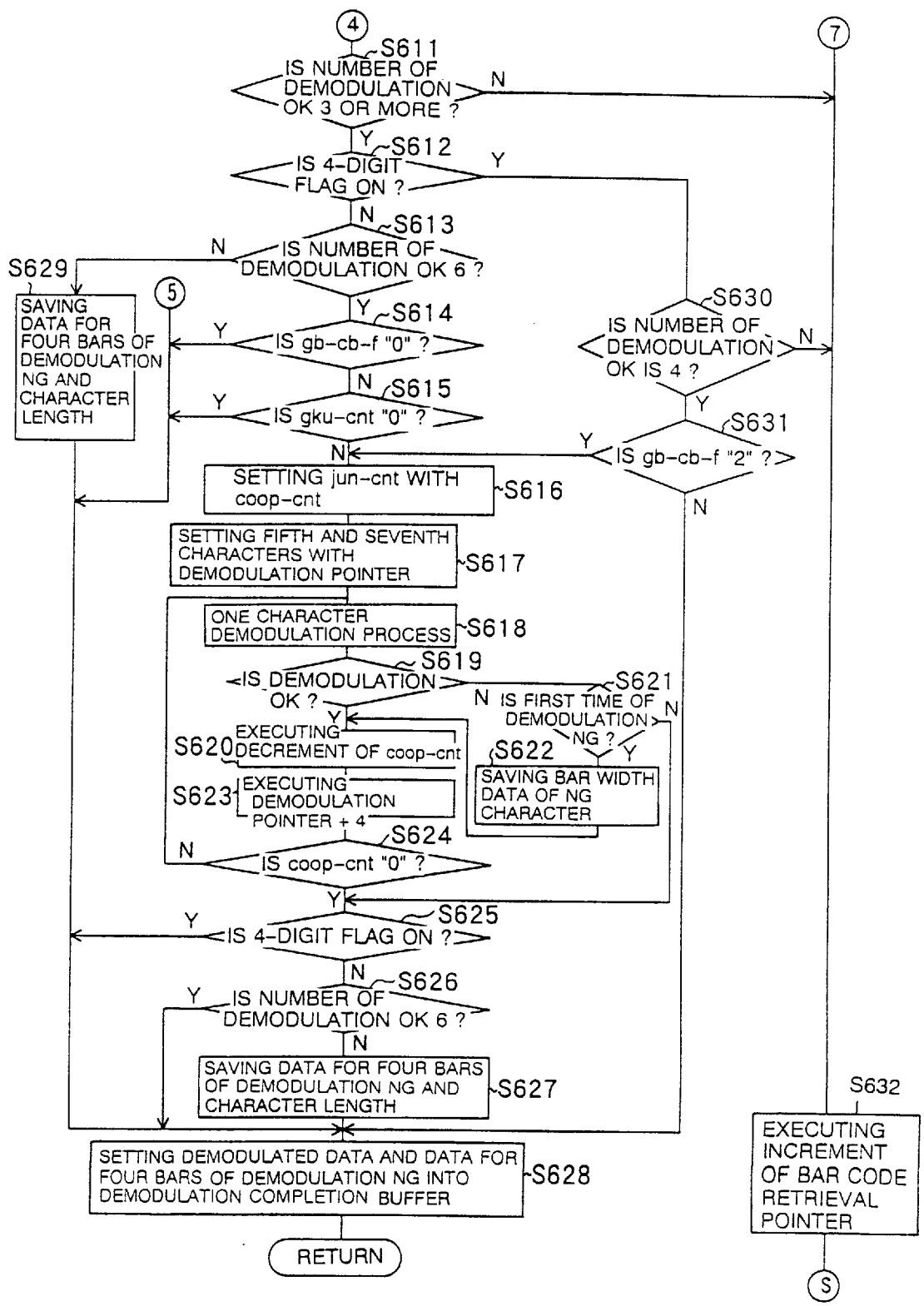
FIG. 18 is a flowchart showing a bar code demodulation process subroutine executed in S003 shown in FIG. 10.
Figure 19:
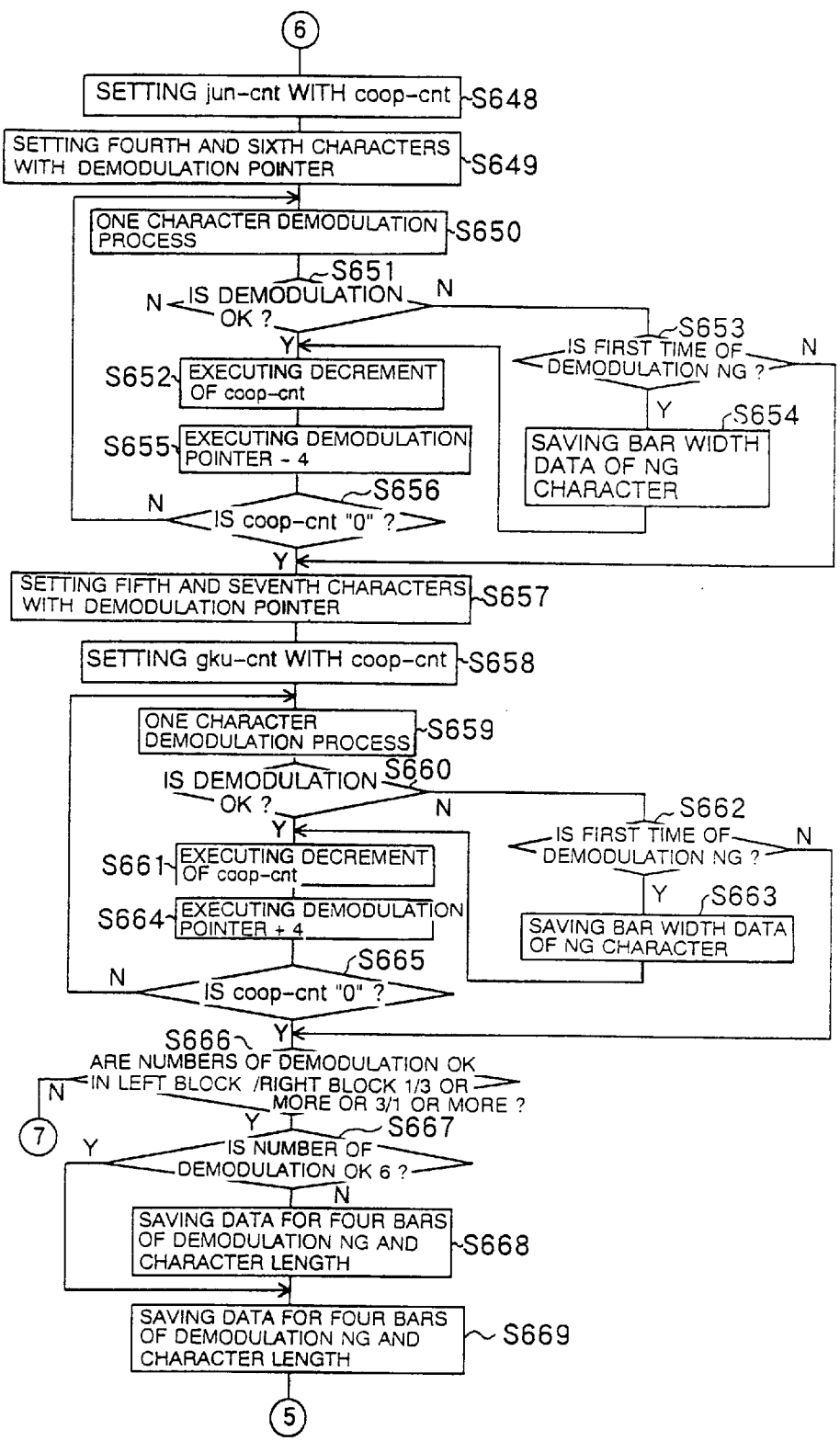
FIG. 19 is a flowchart showing a bar code demodulation process subroutine executed in S003 shown in FIG. 10.

In the main routine, the CPU 1 executes the bar code demodulation process in the S003 after the S002 (equivalent to the demodulation unit). FIGS. 17 through 19 are flowcharts showing the bar code demodulation subroutine executed in the S003.

In the first S601 after entering this subroutine, the CPU 1 checks whether the flag decdirec set in the S106, the S116, the S118 or the S122 is "1" or not. The CPU 1 sets the value of the counter jun-cnt for the variable loop-cnt in the S602 when the flag decdirec is "1" (when the pseudo start guard bar is detected for the first time).

In the next S603, the CPU 1 sets the demodulation pointer at the top bar (white bar (a)) position of the first character in the bar width data group to be processed.

Then, the CPU 1 executes the loop process between the S604 through the S610 in order to sequentially demodulate data characters (characters judged as the length is around the fixed value) in the left data block. In the first S604 after entering the loop, the CPU 1 executes the demodulation process for the character indicated by the demodulation pointer. Concretely, the CPU 1, based on the bar width total (δ distance T1) of the third bar (white bar (a)) and the fourth bar (black bar (d)) counted from the white bar (a) at the position indicated by the demodulation pointer and the bar width total (δ distance T2) of the second bar (black bar (b)) and the third bar (white bar (c)) counted from the white bar (a) at the position indicated by the demodulation pointer, retrieves the list shown in FIG. 29, and reads the corresponding demodulated data (combination of the ODD/EVEN structure and the numerical value). In addition, when the δ distances T1 and T 2 are 3 or 4, there are respectively two kinds of corresponding demodulated data, therefore, it is impossible to specify one from the two kinds of data. In that case, the CPU 1, based on the number of modules of the rightmost black bar, further retrieves the list shown in FIG. 29, and specifies the corresponding demodulated data. The CPU 1 stores the demodulated data read and specified in this way into the specific position in the temporary saving buffer 6a (refer to FIG. 4).

In the next S605, the CPU 1 checks whether the demodulation process in the S604 is successful or not. The CPU 1 advances the process to the S606 when the demodulation process is successful, and advances the process to the S607 when the demodulation process is unsuccessful.

In the S607, the CPU 1 checks whether or not the failure of the demodulation process is the first time after entering the bar code demodulation process. The CPU 1, when the demodulation process fails once, advances the process to the S606 after saving the bar width data of four bars to be the character failing in demodulation in the S608. On the contrary, the CPU 1 advances the process to the S611 in order to stop the demodulation process for the left data block, when the demodulation process fails twice or more times.

In the S606, the CPU 1 executes one decrement for the variable loop-cnt

In the next S609, the CPU 1 advances the demodulation pointer by four pieces of bar width data. That is, the CPU 1 sets the demodulation pointer to the top bar (white bar (a)) of the data character adjacent in the forward direction.

In the next S610, the CPU 1 checks whether the variable loop-cnt is "0" or not. The CPU 1 returns the process to the S604 when the variable loop-cnt does not yet reach "0". Alternately, the CPU 1 advances the process to the S611 when the variable loop-cnt reaches "0" as a result of repeating the loop process of the S604 through the S610.

In the S611, the CPU 1 checks whether the number of the data characters judged as the demodulation process is successful in the S605 is three or more. The CPU 1, when the number of the data characters successful in demodulation is less than three, advances the process to the S016 shown in FIG. 10 after increment of the bar code retrieval pointer in the S632. Alternately, the CPU 1 advances the process to the S612 when the number of the data characters successful in demodulation is three or more.

In the S612, the CPU 1 checks whether "the four-digit flag" is set or not. The CPU 1, when the "four-digit flag" is set, in the S630, checks whether the number of the data characters judged as the demodulation process is successful in the S605 is 4 or not. The CPU 1, when the number of the data characters successful in demodulation is not four, advances the process to the S016 shown in FIG. 10 after increment of the bar code retrieval pointer in the S632. Alternately, the CPU 1, when the number of the data characters successful in demodulation is 4, checks whether the flag gb-cb-f is set with "2" in the S631. The CPU 1 advances the process to S616 when the flag gb-cb-f is set with "2", and advances the process to the S628 when the flag gb-cb-f is not set with "2".

On the other hand, the CPU, when judging that the "four-digit flag" is not set in the S612, in the S613, checks whether the number of the data characters judged as the demodulation process is successful in the S605 is 6 or not. The CPU 1, when the number of the data characters successful in demodulation is not 6, stores into the position of the temporary saving buffer 6a (refer to FIG. 4) with the bar width data of four bars saved in the S608 (the bar width data of four bars to be the data character failing in demodulation) and with the length of the data character immediately before the data character failing in demodulation. After the S629, the CPU 1 advances the process to the S629. Alternately, the CPU 1 advances the process to the S614 when judging that the number of data characters successful in demodulation is 6.

In the S614, the CPU 1 checks whether the flag gb-cb-f is set with "0" or not. The CPU 1 advances the process to the S628 when the flag gb-cb-f is set with "0", and advances the process to the S615 when the flag gb-cb-f is not set with "0".

In the S615, the CPU 1 checks whether the value of the counter gku-cnt is "0" or not. The CPU 1, when the value of the counter gku-cnt is "0", takes that there is no data character to be the right data block and advances the process to the S628, and, when the value of the counter gku-cnt is not "0", takes that there is a data character to be the right data block and advances the process to the S616.

In the S616, the CPU 1 sets the value of the counter gku-cnt for the variable loop-cnt.

In the next S617, the CPU 1 sets the demodulation pointer at the position of the top bar (white bar (a)) of the fifth character (when the "four-digit flag is set) or the seventh character (when the "four-digit flag" is not set) in the bar width data group to be processed.

Then, the CPU 1 execute the loop process of the S618 through the S624 in order to sequentially demodulate the data character to be the right data block (data character judged as the length is around the fixed value). In the first S618 after entering this loop, the CPU 1 executes the demodulation process for the character indicated by the demodulation pointer. The CPU 1 stores the demodulated data obtained by this demodulation process into the corresponding position in the temporary saving buffer 6a (refer to FIG. 4).

In the next S619, the CPU 1 checks whether the demodulation process in the S618 is successful or not. The CPU 1 advances the process to the S620 when the demodulation process is successful, and advances the process to the S621 when the demodulation process is unsuccessful.

In the S621, the CPU 1 checks whether the failure of the demodulation process is the first time or not after entering this bar code demodulation process. The CPU 1, when demodulation is unsuccessful once, advances the process to the S620 after saving the bar width data of four bars to be the data character failing in the demodulation process in the S622. On the contrary, the CPU 1, when demodulation is unsuccessful twice or more times, advances the process to the S625 in order to stop the demodulation process of the right data block.

In the S620, the CPU 1 executes one decrement for the variable loop-cnt

In the next S623, the CPU 1 advances the demodulation pointer by four pieces of bar width data. That is, the CPU 1 sets the demodulation pointer at the top bar of the data character adjacent in the forward direction (white bar (a)).

In the next S624, the CPU 1 checks whether the variable loop-cnt is "0" or not. The CPU 1 returns the process to the S618 when the variable loop-cnt does not yet reach "0". Alternately, the CPU 1 advances the process to the S625, when the variable loop-cnt reaches "0" as a result of repeating the loop process of the S618 through the S624.

In the S625, the CPU 1 checks whether the "four-digit flag" is set or not. The CPU 1 advances the process to the S628 when the "four-digit flag" is set. On the contrary, the CPU 1 advances the process to the S626 when the "four-digit flag" is not set.

In the S626, the CPU 1 checks whether the number of the data characters judged as the demodulation process is successful in the S619 is 6 or not. The CPU 1 advances the process to the S628 when the number of the data character successful in demodulation is 6. On the contrary, the CPU 1, when the number of the data characters successful in demodulation is not six, stores into the corresponding position in the temporary saving buffer 6a (refer to FIG. 4) with the bar width data of four bars saved in the S622 (the bar width data of four bars to be the data character failing in demodulation) and with the length of the data character immediately before the data character failing in demodulation. After the S627, the CPU 1 advances the process to the S628.

In the S628, the CPU 1 copies into the first demodulation completion buffer 6b (refer to FIG. 7) with the data in the temporary saving buffer 6a including the demodulated data stored in the S604 and the S618 and the bar width data of four bars stored in the S629 and the S627. After the S628, the CPU 1 terminates the bar code demodulation process routine, and returns the process to the main routine shown in FIG. 10.

Further, the CPU 1 checks whether the flag decdirec set in the S106, the S116, the S118 or the S122 is "2" or not in the S633 when judging that the flag decdirec is not "1" in the S601. The CPU 1 sets the value of the counter jun-cnt into the variable loop-cnt in the S634 when the flag decdirec is "2" (when the end guard bar is detected at the first time).

In the next S635, the CPU 1 sets the demodulation pointer at the position of the top bar (white bar (a)) of the end character in the bar width data to be processed.

Then, the CPU 1 executes the loop process of the S636 through the S642 in order to demodulate the data character to be the right data block (character assumed that the length is around the fixed value) sequentially in the backward direction. In the first S636 after entering this loop, the CPU 1 executes the demodulation process for the character indicated by the demodulation pointer. The CPU 1 stores the demodulated data obtained by this demodulation process into the corresponding position in the temporary saving buffer 6a (refer to FIG. 5).

In the next S637, the CPU 1 checks whether the demodulation process in the S636 is successful or not. The CPU 1 advances the process to the S638 when the demodulation process is successful, and advances the process to the S639 when the demodulation process is unsuccessful.

In the S639, the CPU 1 checks whether this is the first failure of the demodulation process after entering this bar code demodulation process. The CPU 1, when this is the first demodulation failure, advances the process to the S638 after saving the bar width data of four bars to be the data character failing in the demodulation process in the S640. The CPU 1, when demodulation is unsuccessful twice or more times, advances the process to the S643 in order to stop the demodulation process for the right data block.

In the S638, the CPU 1 executes one decrement for the variable loop-cnt.

In the next S641, the CPU 1 turns back the demodulation pointer by four pieces of bar width data. That is, the CPU 1 sets the demodulation pointer at the top bar (white bar (a)) of the data character adjacent in the backward direction.

In the next S642, the CPU 1 checks whether the variable loop-cnt is "0" or not. The CPU 1 returns the process to the S636 when the variable loop-cnt does not yet reach "0". On the contrary, the CPU 1 advances the process to the S643 when the variable loop-cnt reaches "0" as a result of repeating the loop process of the S636 through the S642.

In the S643, the CPU 1 checks whether the number of the data character judged as the demodulation process is successful in the S636 is three or more. The CPU 1, when the number of the data character successful in demodulation is less than three, advances the process to the S016 shown in FIG. 10 after increment of the bar code retrieval pointer in the S632. On the contrary, the CPU 1 advances the process to the S644 when the number of the data character successful in demodulation is three or more.

In the S644, the CPU 1 checks whether the "four-digit flag" is set or not. The CPU 1, when the "four-digit flag" is set, checks whether the number of the data characters judged as the demodulation process is successful in the S637 is 4 or not in the S645. The CPU 1, when the number of the data characters successful in demodulation is not 4, advances the process to the S016 shown in FIG. 10 after increment of the bar code retrieval pointer in the S632. On the contrary, the CPU 1 advances the process to the S628 when the number of the data characters successful in demodulation is four.

Further, the CPU 1, when judging that the "four-digit flag" is not set in the S644, checks whether the number of the data characters judged as the demodulation process is successful in the S637 is 6 or not in the S646. The CPU 1 advances the process to the S628 when the number of the data character successful in demodulation is 6, and advances the process to the S647 when the number of data characters successful in demodulation is not 6.

In the S647, the CPU 1 stores into the corresponding position in the temporary saving buffer 6a (refer to FIG. 5) with the bar width data of four bars saved in the S640 (bar width data of four bars constituting the data character failing in demodulation) and with the length of the data character immediately before the data character failing in demodulation. After the S647, the CPU 1 advances the process to the S628.

In the S628, the CPU 1 copies into the second demodulation completion buffer 6c (refer to FIG. 8) with the data in the temporary saving buffer 6a containing the demodulated data stored in the S636 and the bar width data of four bars stored in the S640. After the S628, the CPU 1 terminates the bar code demodulation process routine, and returns the process to the main routine shown in FIG. 10.

On the other hand, the CPU 1 sets the value of the counter jun-cnt for the variable loop-cnt in the S648 when judging that the flag decdirec is not "2" in the S633.

In the next S649, the CPU 1 sets the demodulation pointer at the position of the top bar (white bar (a)) of the fourth character (when the "four-digit flag is set) or the sixth character (when the "four-digit flag" is not set) in the bar width data group to be processed.

Then, the CPU 1 executes the loop process of the S650 through the S656 in order to demodulate data characters to be the left data block (characters assumed that the length is around the fixed value) sequentially in the backward direction. In the first S650 after entering the loop, the CPU 1 executes the demodulation process for the character indicated by the demodulation pointer. The CPU 1 stores the demodulated data obtained by this demodulation process into the corresponding position of the temporary saving buffer 6a (refer to FIG. 6).

In the next S651, the CPU 1 checks whether the demodulation process in the S650 is successful or not. The CPU 1 advances the process to the S652 when the demodulation process is successful, and advances to the S653 when the demodulation process fails.

In the S653, the CPU 1 checks whether this is the first failure of the demodulation process after entering the loop process of the S650 through the S656. The CPU 1, when this is the first failure, advances the process to the S652 after saving the bar width data of four bars constituting the data character failing in the demodulation process in the S654. On the contrary, the CPU 1, when demodulation is unsuccessful twice or more times, advances the process to the S657 in order to stop the demodulation process for the left data block.

In the S657, the CPU 1 executes one decrement for the variable loop-cnt.

In the next S655, the CPU 1 returns the demodulation pointer by four pieces of bar width data. That is, the CPU 1 sets the demodulation pointer at the top bar (white bar (a)) of the data character adjacent in the backward direction.

In the next S656, the CPU 1 checks whether the variable loop-cnt is "0" or not. The CPU 1 returns the process to the S650 when the variable loop-cnt does not yet reach "0". On the contrary, the CPU 1 advances the process to the S657 when the variable loop-cnt reaches "0" as a result of repeating the loop process of the S650 through the S656.

In the S657, the CPU 1 sets the demodulation pointer at the position of the top bar (white bar (a)) of the fifth character (when the "four-digit flag is set) or the seventh character (when the "four-digit flag" is not set) in the bar width data group to be processed.

In the next S658, the CPU 1 sets the value of the counter gku-cnt for the variable loop-cnt.

Then, the CPU 1 executes the loop process of the S659 through the S665 in order to demodulate data characters to be the right data block (characters assumed that the length is around the fixed value) sequentially in the forward direction. In the first S659 after entering this loop, the CPU 1 executes the demodulation process for the character indicated by the demodulation pointer. The CPU 1 stores the demodulation data provided by this demodulation process into the corresponding position of the temporary saving buffer 6a (refer to FIG. 6).

In the next S660, the CPU 1 checks whether the demodulation process in the S659 is successful or not. The CPU 1 advances the process to the S661 when the demodulation process is successful, and advances the process to the S662 when the demodulation process is unsuccessful.

In the S662, the CPU 1 checks whether this is the first failure of the demodulation process after entering the loop process of the S659 through the S665. The CPU 1, when this is the first failure, advances the process to the S661 after saving the bar width data of four bars constituting the data character failing in the demodulation process in the S663. On the contrary, the CPU 1, when demodulation is unsuccessful twice or more times, advances the process to the S666 in order to stop the demodulation process for the right data block.

In the S661, the CPU 1 executes one decrement for the variable loop-cnt.

In the next S664, the CPU 1 advances the demodulation pointer by four pieces of bar width data. That is, the CPU 1 sets the demodulation pointer to the top bar (white bar (a)) of data character adjacent in the forward direction.

In the next S665, the CPU 1 checks whether the variable loop-cnt is "0" or not. The CPU 1 returns the process to the S659 when the variable loop-cnt does not yet reach "0". On the contrary, the CPU 1 advances the process to the S666 when the variable loop-cnt reaches "0" as a result of repeating the loop process of the S659 through the S665.

In the S666, the CPU checks whether the number of demodulated data successful in demodulation in the S650 in the left data block is one or more and the number of demodulated data successful in demodulation in the S659 in the right data block is three or more, or whether the number of demodulated data successful in demodulation in the S650 in the left data block is three or more and the number of demodulated data successful in demodulation in the S659 in the right data block is one or more. The CPU 1 advances the process to the S016 shown in FIG. 10 after increment of the bar code retrieval pointer in the S632 when the number of the demodulation data in any block are less than three, and when the number of the demodulation data in one block is 0. On the contrary, the CPU 1 advances the process to the S667 when the number of demodulated data in one block is three or more and the number of demodulated data in another block is one or more.

In the S667, the CPU 1 checks whether the number of demodulated data successful in demodulating in the S659 in the left data block is 6 or not. The CPU 1 advances the process to the S669 when the number of demodulated data in the left data block is six, and the advances the process to the S668 when the number of demodulated data in left data block is not 6. In the S668, the CPU 1 stores into the corresponding position of the temporary saving buffer 6a (refer to FIG. 6) with the bar width data of four bars saved in the S654 (bar width data of four bars constituting the data character failing in demodulation) and with the length of the data character immediately before the data character failing in demodulation. After the S668, the CPU 1 advances the process to the S669.

In the S669, the CPU 1 stores into the corresponding position in the temporary saving buffer 6a (refer to FIG. 6) with the bar width data of four bars saved in the S663 (bar width data of four bars constituting the data character failing in demodulation) and with the length of the data character immediately before the data character failing in demodulation. After the S669, the CPU 1 advances the process to the S628.

In the S628, the CPU 1 copies into the third demodulation completion buffer 6d (refer to FIG. 9) with the data in the temporary saving buffer 6a containing the demodulated data stored in the S650 and the S659 and the bar width data stored in the S668 and the S669. After the S628, the CPU 1 terminates the bar code demodulation process routine, and returns the process to the main routine shown in FIG. 10.

In the main routine, after the S003, the CPU 1 checks whether the bar width data group which is the process object for the bar code demodulation process in the S003 is obtained by the continuous reading or not. This check is executed based on whether the flag gb-cb-f is set with "2" in the S323 or the S326. The CPU 1 advances the process to the S008 when the demodulated data is not obtained by the continuous reading, namely, when the flag gb-cb-f is set with "0" or "1". On the contrary, the CPU 1 advances the process to the S005 when by the continuous reading, namely, when the flag gb-cb-f is set with "2".

In the S005, the CPU 1 checks whether all data characters contained in the bar width data group are completely demodulated by the bar code demodulation process in the S003. The CPU 1 advances the process to the S008 when all data characters are completely demodulated. On the contrary, the CPU 1 advances the process to the S006 when all data characters are not completely demodulated.

Figure 20:
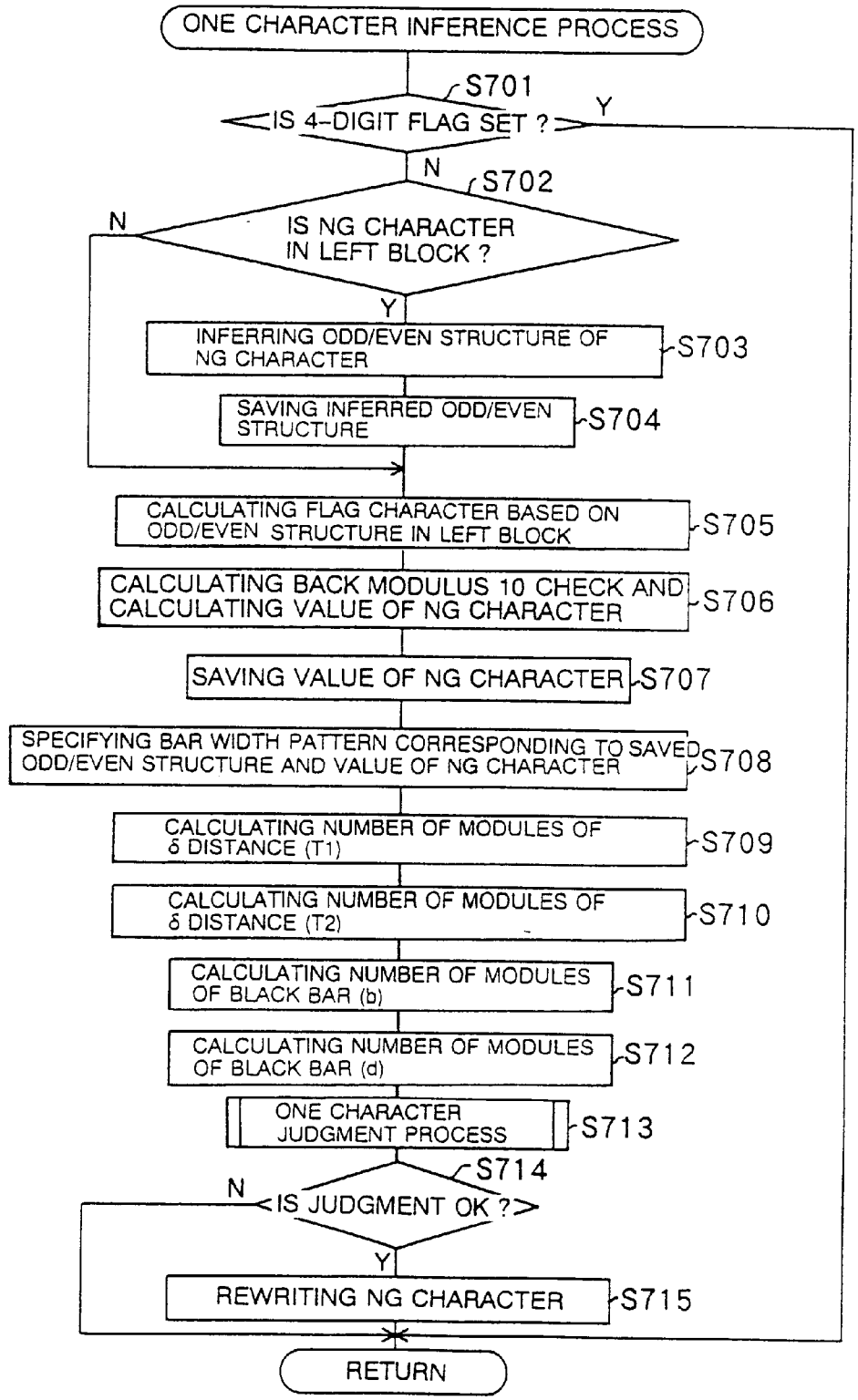
FIG. 20 is a flowchart showing a 1-character inference process subroutine executed in S007 and S011 shown in FIG. 10.

In the S006, the CPU 1 checks whether only 1 character fails in demodulation during the bar code demodulation process in the S003. The CPU 1 advances the process to the S008 when 2 or more characters fails in demodulation. On the contrary, the CPU 1, when only 1 character fails in demodulation, executes the 1-character inference process (equivalent to the data inference unit and the parity inference unit) in order to infer demodulated data corresponding to the character failing in demodulation in the S007. FIG. 20 is a flowchart showing the 1-character inference process subroutine executed in the S007.

In the first S701 after entering this subroutine, the CPU 1 checks whether the "four-digit flag" is set or not. When the "four-digit flag" is set, it is impossible to infer characters, therefore, the CPU 1 terminates the 1-character inference process subroutine promptly, and then returns the process to the main routine shown in FIG. 10. On the contrary, the CPU 1 advances the process to the S702 when the "four-digit flag" is not set.

In the S702, the CPU 1 checks whether the character failing in demodulation during the bar code demodulation process in the S003 is in the left data block or not. The CPU 1 advances the process to the S705 since it is unnecessary to infer the ODD/EVEN structure when the character failing in demodulation is in the right data block. On the contrary, the CPU 1 advances the process to the S703 when the character failing in demodulation is in the left data block.

In the S703, the CPU 1 infers the ODD/EVEN structure of 1-character failing in demodulation based on the 5-characters in the left data block successful in demodulation by using the list shown in FIG. 30 as above described (equivalent to the parity inference unit).

In the next S704, the CPU 1 saves the ODD/EVEN structure inferred in the S703. After the S704, the CPU 1 advances the process to the S705.

In the S705, the CPU 1 calculates a corresponding flag character based on the ODD/EVEN structure of 6-characters to be the left data block (including the ODD/EVEN structure saved in the S704) by using the list shown in FIG. 30.

In the next S706, the CPU 1, based on the numerical values of 11-characters successful in demodulation and the numerical value of the flag character calculated in the S705, calculates back the modulus 10 check (the predetermined conditional expression), and calculates a numerical value coded by the character failing in demodulation (equivalent to the data inference unit).

In the next S707, the CPU 1 saves the numerical value calculated in the S706.

In the next S708, the CPU 1, based on the list shown in FIG. 29, specifies the ODD/EVEN structure saved in the S704 (EVEN when the S703 is not executed) and the bar width pattern corresponding to the numerical value saved in the S707.

In the next S709, the CPU 1 calculates the total of modules (δ distance T1) of the white bar (c) and the black bar (d) stored in one of the first demodulation completion buffer 6b through the third demodulation completion buffer 6d, to which demodulated data is stored in the S003. In this calculation, the CPU 1 substitutes the character length stored in one of the buffers 6b through 6d, which is equal to the buffer storing the demodulated data, for "C" in the coordinate shown in FIG. 31. Then the CPU 1 calculates the position (number of modules) of the white bar (c) and the black bar (d) in this coordinate to decimal places. Then, the CPU 1 rounds the calculated position (number of modules) off to one decimal place.

In the next S710, the CPU 1 calculates the total of modules (δ distance T2) of the black bar (b) and the white bar (c) stored in one of the first demodulation completion buffer 6b through the third demodulation completion buffer 6d, to which demodulated data is stored in the S003 similarly to the S709.

In the next S711, the CPU 1 calculates the total of modules of the black bar (b) stored in one of the first demodulation completion buffer 6b through the third demodulation completion buffer 6d, to which demodulated data is stored in the S003 similarly to the S709.

In the next S712, the CPU 1 calculates the total of modules of the black bar (d) stored in one of the first demodulation completion buffer 6b through the third demodulation completion buffer 6d, to which demodulated data is stored in the S003 similarly to the S709.

Figure 21:
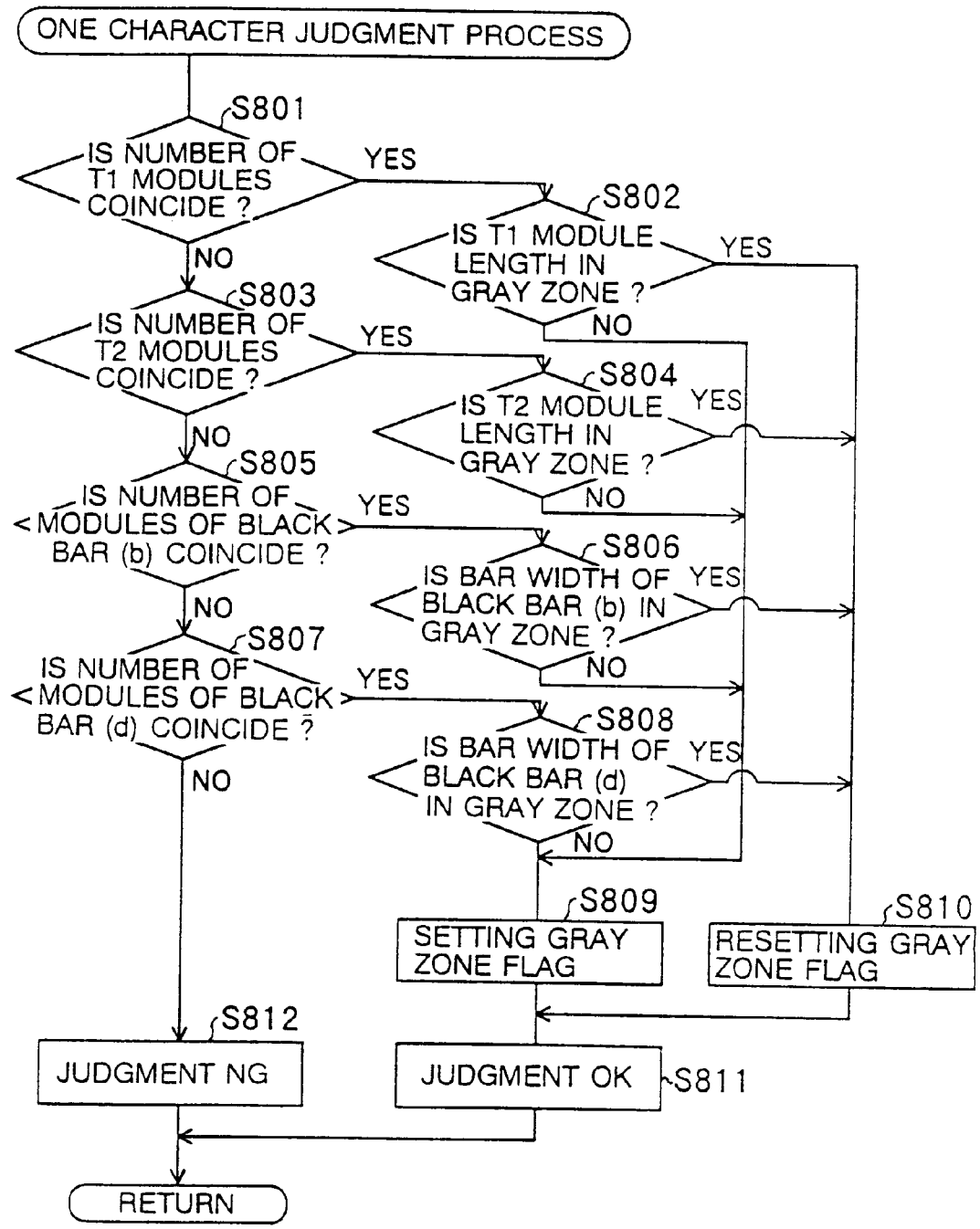
FIG. 21 is a flowchart showing a 1-character judgment process subroutine executed in S713 shown in FIG. 20.

In the next S713, the CPU 1 executes the 1-character judgment process based on the numbers of modules calculated in the S709 through the S712. FIG. 21 is a flowchart showing the 1-character judgment process subroutine executed in the S713.

In the first S801 after entering this flowchart, the CPU 1 checks whether the number of modules of the δ distance T1 in the bar width pattern specified in the S708 with the number of modules of the δ distance T1 calculated in the S709 (equivalent to a comparison unit). The CPU 1 advances the process to the S803 when the both are not coincide, and advances the process to the S802 when the both are coincide.

In the S802, the CPU 1 checks whether or not the position of the δ distance T1 calculated by the module number calculation in the S709 before rounding off (ratio between the δ distances) is in the gray zones (0.5 through 0.7, 1.3 through 1.7, 2.3 through 2.7, 3.3 through 3.7, 4.3 through 4.7, 5.3 through 5.5). The CPU 1 advances the process to the S810 when the position of the δ distance T1 (ratio between δ distances) is in the gray zone (when exceeding the first predetermined ratio and being in the second predetermined ratio), and advances the process to the S809 when being out of the gray zones (when being in the first predetermined ratio).

On the other hand, in the S803, CPU 1 checks whether the number of modules of the δ distance T2 in the bar width pattern specified in the S708 and the number of modules of the δ distance T 2 calculated in the S710 (equivalent to the comparison unit). The CPU 1 advances thee process to S805 when the both are not coincide, and advances the process to the S804 when the both are coincide.

In the S804, the CPU 1 checks whether or not the position of the δ distance T 2 calculated by the module number calculation in the S710 before rounding off (ratio between the δ distances) is in the gray zones. The CPU 1 advances the process to the S810 when the position of the δ distance T 2 (ratio between the δ distanced) is the gray zones (when exceeding the first predetermined ratio and being in the second predetermined ratio), and advances the process to the S809 when being out of the gray zones (when being in the first predetermined ratio).

On the other hand, in the S805, the CPU 1 checks whether the number of modules of the black bar (b) specified in the S708 is coincide with the number of modules of the black bar (b) calculated in the S711 (equivalent to the comparison unit). The CPU 1 advances the process to the S807 when the both are not coincide, and advances the process to the S806 when the both are coincide.

In the S806, the CPU 1 checks whether the position of the black bar (b) before rounding off, the position calculated by the module number calculation in the S711 (ratio between bars) is in the gray zones or not. The CPU 1 advances the process to the S810 when the position of the black bar (b) (ratio between bars) is in the gray zones (when exceeding the first predetermined ratio, and being in the second predetermined ratio), and advances the process to the S809 when being out of the gray zones (when being in the first predetermined ratio).

On the other hand, in the S807, the CPU 1 checks whether the number of modules of the black bar (d) in the bar width pattern specified in the S708 is coincide with the number of modules of the black bar (d) calculated in the S712 (equivalent to the comparison unit). The CPU 1 advances the process to the S812 when the both are not coincide, and advances the process to the S808 when the both are coincide.

In the S808, the CPU 1 checks whether the position of the black bar (d) before rounding off, the position calculated by the module number calculation in the S712 (ratio between bars) is in the gray zones or not. The CPU 1 advances the process to the S810 when the position of the black bar (d) (ratio between bars) is in the gray zones (when exceeding the first predetermined ratio and being in the second predetermined ratio), and advances the process to the S812 when being out of the gray zoned (when being in the first determined ratio).

The CPU 1 sets a "gray zone flag" in the S809, and resets the "gray zone flag" in the S810. The CPU 1, after the S809 or S810, sets a "judgment OK" flag in the S811 (equivalent to the validating unit), and then terminates the 1-character judgment process and returns the process to the routine shown in FIG. 20.

On the other hand, in the S812, the CPU 1 sets a "judgment NG" flag. Thereafter, the CPU 1 terminates the 1-character judgment process subroutine, and returns the process to the routine shown in FIG. 20.

In the routine to which the process is returned shown in FIG. 20, in the S714 next to the S713, the CPU 1 check whether the "judgment OK" flag is set in the S811 or the "judgment NG" flag is set in the S812. The CPU 1, when setting the "judgment OK" flag, takes the ODD/EVEN structure saved in the S704 and the numerical value saved in the S707 as demodulated data corresponding to the data character failing in demodulation, and writes them at the corresponding position in one of the first demodulation completion buffer 6b through the third demodulation completion buffer 6d, in which demodulated data is stored in the S003 (equivalent to the validating unit). Alternately, the CPU 1 jumps over the S715 when the "judgment NG" flag is set. The CPU 1, in any case, terminates the 1-character inference process subroutine, and returns the process to the main routine shown in FIG. 10.

In the main routine shown in FIG. 10, the CPU 1 advances the process to the S008 after the S007.

Figure 22:
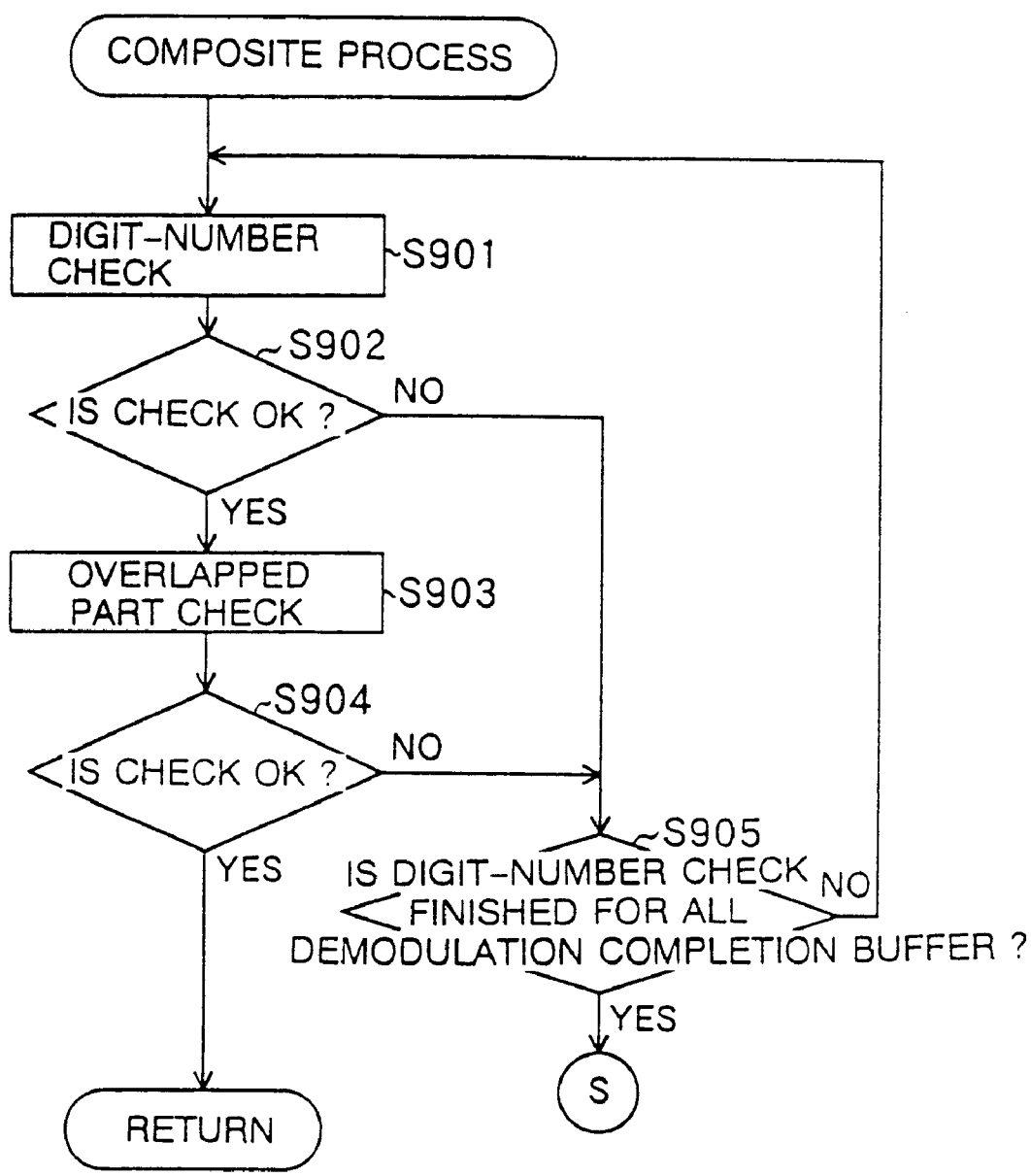
FIG. 22 is a flowchart showing a synthesis process subroutine executed in S008 shown in FIG. 10.

In the S008, the CPU 1 executes the composite process. FIG. 22 is a flowchart showing the composite process subroutine executed in the S008. In the first S901 after entering this subroutine, the CPU 1 executes a digit number check. In other words, the CPU 1 calculates the sum of the total of pieces of demodulated data stored in one of the first demodulation completion buffer 6b through the third demodulation completion buffer 6d, into which demodulated data is stored in the S003, and the total of pieces of demodulated data stored in another demodulation completion buffer 6b, 6c or 6d, and checks whether the sum exceeds 12 digits or not.

The CPU 1 advances the process from the S902 to the S905 when the result of the digit number check is failure.

On the other hand, the CPU 1 advances the process from the S902 to the S903 when the result of the digit number check is good. In the S903, the CPU 1 executes an overlapped part check. In other words, the CPU 1 checks whether demodulated data in the respective demodulation completion buffers 6b through 6d to be processed in the digit number check are partially overlapped one another. The CPU 1 advances the process from the S904 to the S905 when the result of the overlapped part check is failure.

In the S905, the CPU 1 checks whether the digit number check in the S901 (addition of the total of demodulated data) is executed for all demodulation completion buffers 6b through 6d. The CPU 1 returns the process to the S901 when the digit number check in the S901 is not completed for all demodulation completion buffers 6b through 6d. On the contrary, the CPU 1 advances the process to the S016 shown in FIG. 10 when the digit number check in the S901 is completed for all demodulation completion buffers 6b through 6d.

On the other hand, when the result of the overlapped part check in the S903 is good, the CPU 1 terminates the composite process subroutine, and returns the process to the main routine shown in FIG. 10.

In the main routine shown in FIG. 10, the CPU 1 advances the process to the S009 after the S008. In the S009, the CPU 1 executes the modulus 10 check for each demodulated data stored in each demodulation completion buffer 6b through 6d which is the object of the composite process in the S008 in a state that the overlapped parts are connected overlappedly. The CPU 1 advances the process to the S013 when the result of the modulus 10 check is good, namely, when the demodulation data corresponding to the bar code 21 can be reproduced. On the contrary, the CPU 1 advances the process to the S010 when the result of the modulus 10 check is failure, namely, when the demodulation data corresponding to the bar code 21 can not be reproduced.

In the S010, the CPU 1 checks whether 1 character lacks or not because of that the result of the modulus 10 check in the S009 is failure. The CPU 1 advances the process to the S016 when the result of the modulus 10 check is failure not because of lack of 1 character. On the contrary, when the result of the modulus 10 check is failure because of lack of 1 character, the CPU 1 advances the process to the S012 after executing the 1-character inference process in the S011 (FIG. 20).

In the S012, the CPU 1 again executes the modulus 10 check for the demodulated data in which 1 character is inferred. The CPU 1 advances the process to the S016 when the result of the modulus 10 check is failure, namely, when the demodulated data corresponding to the bar code 21 can not be reproduced. On the contrary, the CPU 1 advances the process to the S013 when the result of the modulus 10 check is good, namely when the demodulated data corresponding to the bar code 21 can be reproduced.

Figure 23:
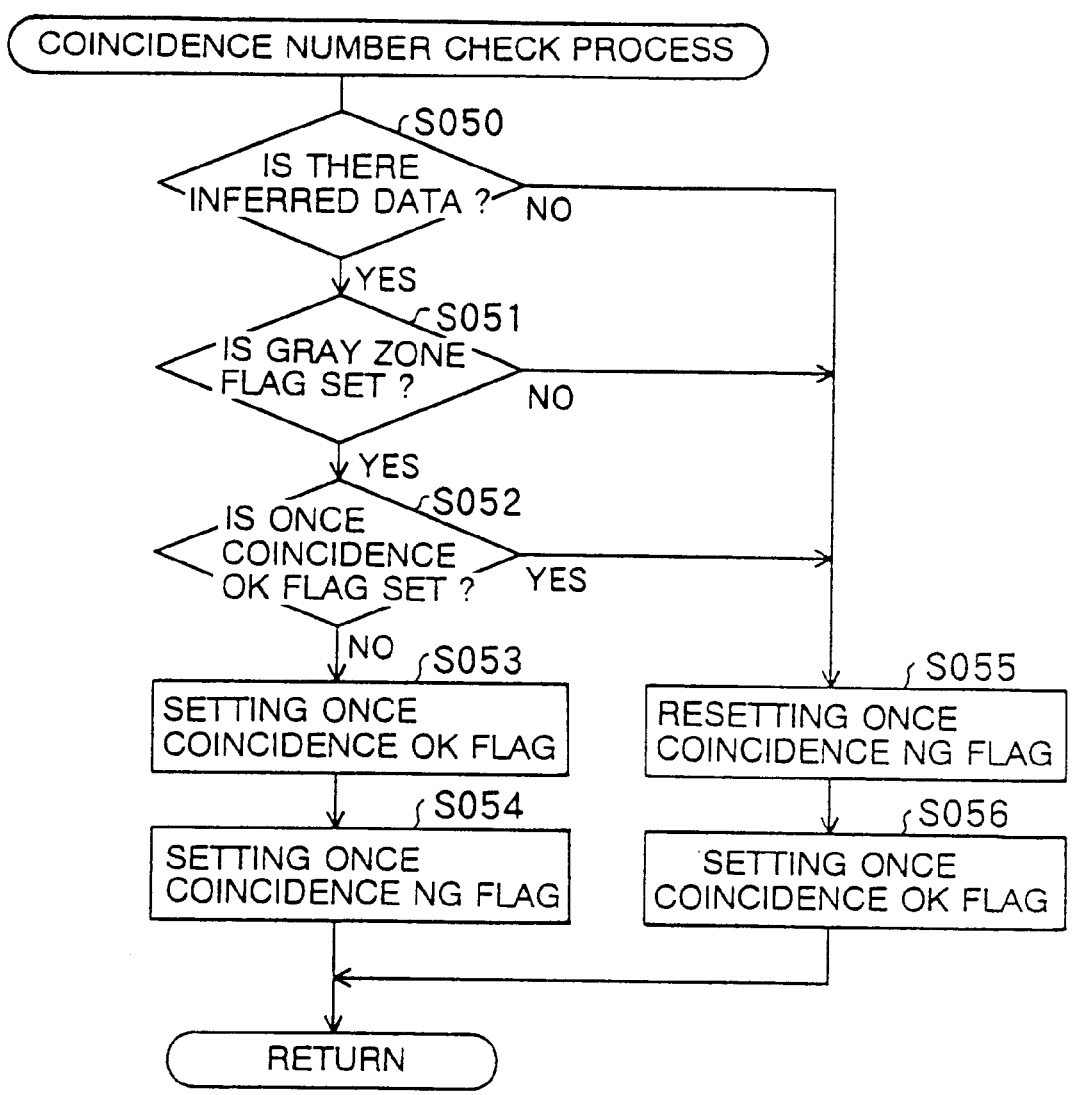
FIG. 23 is a flowchart showing a coincidence number check process subroutine executed in S013 shown in FIG. 10.

In the S013, the CPU 1 executes a coincidence number check process. FIG. 23 is a flowchart showing the coincidence number check subroutine executed in the S013. In the first S050 after entering this subroutine, the CPU 1 checks whether the demodulated data inferred by the 1-character inference process in the S007 or the S011 is included in the demodulated data to be checked by the modulus 10 check. The CPU 1 advances the process to the S055 when the demodulated data which is inferred supposed is not included. In this case, since the reliability of the result of the modulus 10 check is high, in order to execute a reading OK process immediately, the CPU 1 resets the "coincidence number NG flag" in the S055 and sets the "coincidence number OK flag" in the S056, thereafter, terminates the coincidence number check process subroutine.

On the other hand, the CPU 1 checks whether "the gray zone flag" is set or not in the S051 when judging that the demodulated data which is inferred is included in the S050. The CPU 1 advances the process to the S055 when the "gray zone flag" is not set. In this case, since reliability of the result of the modulus 10 check is comparatively high, in order to execute the reading OK process immediately, the CPU 1 resets the "coincidence number NG flag" in the S055 and sets the "coincidence number OK flag" in the S056, thereafter, terminates the coincidence number check subroutine (equivalent to the validating unit).

On the contrary, when the "gray zone flag" is set, the reliability of the result of thee modulus 10 check is comparatively low, therefore, the CPU 1 advances the process to the S052 in order to complete reading by setting a condition that the result of the modulus 10 check becomes good twice (equivalent to the validating unit). In the S052, the CPU 1 checks whether the "once coincidence OK flag" is already set. When the "once coincidence OK flag" is not set yet, it is the first time that the result of the modulus 10 check becomes good, the CPU 1, in order to execute the demodulation process for the next bar width data group, sets the "once coincidence OK flag" in the S053 and sets the "once NG flag" in the S054, thereafter, terminates the coincidence number check subroutine. On the contrary, when the "once coincidence OK flag" is already set, it is the second time that the result of the modulus 10 check is good, therefore, the CPU 1, in order to execute the reading OK process, resets the "coincidence number NG flag" in the S055 and sets the "coincidence number OK flag", thereafter, terminates the coincidence number check process subroutine.

The CPU 1 returns the process to the main routine shown in FIG. 10 after finishing the coincidence number check process subroutine.

In the main routine shown in FIG. 10, the CPU 1 advances the process to the S014 after the S013. In the S014, the CPU 1 checks whether the "coincidence number OK flag" is set or not. The CPU 1 advances the process to the S016 when the "coincidence number OK flag" is not set yet (equivalent to the validating unit).

In the S016, the CPU 1 takes out one next bar width data group from the bar width data group storing buffer 2. After completing the S016, the CPU 1 returns the process to the S001, and executes the recognition/demodulation process for the bar width data group.

On the other hand, the CPU 1 executes the "reading OK process" in the S015 when judging that the "coincidence number OK flag" is set in the S014 (equivalent to the validating unit). That is, the CPU 1 makes the speaker output a voice indicating the reading (the demodulation) completion of bar code, and makes the light emitting diode 11 display information such as a price of the item 20 corresponding to the demodulated data. When the "reading OK process" is completed, the CPU 1 finishes the bar code recognition/demodulation process program.

(Operation of Bar Code Reader)

Next, explanations will be given of the operation of the bar code reader structured as above according to this embodiment with reference to FIGS. 25 through 28.

<Case of Demodulation Failure in Left Data Block>

Hereinafter, an explanation will been given of an operation sample of the bar code reader in a case that the third character (C3) in the left data block fails in demodulation because the third character (C3) is patchy as shown in FIG. 25.

As shown in FIG. 25, it is assumed that the scanning beam scans the bar code 21 from the start guard bar (SGB) to the end guard bar (EGB) at a time. In this case, when the third character (C3) is recognized as four bars, and it is recognized that the length of the third character (C3) is around the fixed value, in the first retrieval process in the S001, the pseudo center guard bar is detected (S106), and, in the second retrieval process in the S002, 12 valid characters are retrieved (S324). In the bar code demodulation process in the S003, the demodulation process for each character (S604, S618) is executed sequentially from the first character (C1), and the demodulated data provided by the demodulation process every character is stored in the first demodulation completion buffer 6*b*.

However, when it is not recognized that the number of modules of each bar to be the third character (C3) fits any combination shown in FIG. 29 because of a dirty mark or the like, the demodulation process (S604) for the third character (C3) is unsuccessful, but the bar width data of four bars constituting the third character (C3) is stored in the first demodulation completion buffer 6*b*. Then, for the fourth character (C4) and thereafter, the demodulation process (S604, S618) is continued.

When the bar code demodulation process (S003) is completed in this way, this is a case that the demodulated data is obtained by the continuous reading (S004). In this case, all characters are not completely demodulated (S005) and only one character fails in demodulation (S006), therefore, the 1-character inference process in the S007 is executed.

In the 1-character inference process, the third character (C3) failing in demodulation is contained in the left data block (S702), therefore, the ODD/EVEN structure is inferred in the S703. In this case, the combination coincide with the ODD/EVEN structure of other 5-characters successful in demodulation in the left block is only the combination corresponding to the flag character 1 in the list of FIG. 30. Accordingly, it is inferred that the ODD/EVEN structure of the first character (C3) is "EVEN (even parity)".

Further, in the S706, when the modulus 10 check is calculated back based on the numerical values of the 11 character successful in demodulation and the numerical value of the flag character, the numerical value of the third character is calculated as "0".

Further, in the S708, specified is the bar width pattern (white bar (a), 1 module; black bar (b), 1 module; white bar (c), 2 module; black bar (d), 3 module; δ distance T1, 3 module; δ distance T2, 5 module) corresponding to the demodulated data (E-O) inferred as to the third character (C3). On the other hand, in the S709 through the S712, the number of modules corresponding to the bar width of four bars stored in the first demodulation completion buffer 6*a* and the number of modulus of each δ distance are respectively calculated. Then, the specified number of modules and the calculated number of modules are compared every bar and every δ distance, and when an error between the specified number and the calculated number concerning one bar or δ distance is within +/−0.5, the inferred combination of the ODD/EVEN structure and the numerical value are validated as demodulated data corresponding to the third character (S714, S715).

In this case, the result of the modulus 10 check (S009) becomes naturally good because of the continuous reading. However, when the error becomes within +/−0.3 through 0.5, the "gray zone flag" is set (S881), therefore, in order to validate the inferred data, it becomes a condition that the reading process is executed again and the result of the modulus 10 check becomes good as the result of the coincidence number check process in the S013 (S014, S016). On the contrary, when the error is within +/−0.3, the "gray zone flag" is reset (S810), therefore, the inferred data is validated immediately (S014, S015).

<Case of Demodulation Failure in Left Data Block>

Hereinafter, an explanation will been given of an operation sample of the bar code reader in a case that the ninth character (C9) in the right data block fails in demodulation because the ninth character (C9) is patchy as shown in FIG. 27.

As shown in FIG. 27, it is assumed that the scanning beam scans the bar code 21 from the start guard bar (SGB) to the end guard bar (EGB) at a time. In this case, when the ninth character (C9) is recognized as four bars, and it is recognized that the length of the ninth character (C9) is around the fixed value, in the first retrieval process in the S001, the pseudo center guard bar is detected (S106), and, in the second retrieval process in the S002, 12 valid characters are retrieved (S324). In the bar code demodulation process in the S003, the demodulation process for each character (S604, S618) is executed sequentially from the first character (C1), and the demodulated data provided by the demodulation process every character is stored in the first demodulation completion buffer 6b.

However, though the demodulation process (S618) for the ninth character (C9) is unsuccessful, the bar width data of four bars to be the ninth character (C9) is stored in the first demodulation completion buffer 6b. Then, for the ninth character (C9) and thereafter, the demodulation process (S618) is continued.

When the bar code demodulation process (S003) is completed in this way, this is a case that the demodulated data is obtained by the continuous reading (S004). In this case, all characters are not completely demodulated (S005) and only one character fails in demodulation (S006), therefore, the 1-character inference process in the S007 is executed.

In the 1-character inference process, the ninth character (C9) failing in demodulation is contained in the right data block (S702), therefore, the ODD/EVEN structure is not inferred in the S703 but it is naturally judged as EVEN (even parity). Additionally, in the S705, the numerical value of the flag character is calculated as "1" based on the ODD/EVEN structure of 6-characters successful in demodulation in the left block.

Further, in the S706, when the modulus 10 check is calculated back based on the numerical value of the 11 character successful in demodulation and the numerical value of the flag character, the numerical value of the ninth character is calculated as "2".

Further, in the S708, specified is the bar width pattern (white bar (a), 2 module; black bar (b), 2 module; white bar (c), 1 module; black bar (d), 2 module; δ distance T1, 3 module; δ distance T2, 3 module) corresponding to the demodulated data (E-2) inferred as to the ninth character (C9). On the other hand, in the S709 through the S712, the number of modules corresponding to the bar width of four bars stored in the first demodulation completion buffer 6a and the number of modulus of each δ distance are respectively calculated. Then, the specified number of modules and the calculated number of modules are compared every bar and every δ distance, and when an error between the specified number and the calculated number concerning one bar or δ distance is within +/−0.5, the inferred combination of the ODD/EVEN structure and the numerical value is made effective as demodulated data corresponding to the ninth character (S714, S715).

In this case, the result of the modulus 10 check (S009) becomes naturally good because of the continuous reading. However, when the error becomes within +/−0.3 through 0.5, the "gray zone flag" is set (S881), therefore, in order to validate the inferred data, it becomes a condition that the reading process is executed again and the result of the modulus 10 check becomes good as the result of the coincidence number check process in the S013 (S014, S016). On the contrary, when the error is within +/−0.3, the "gray zone flag" is reset (S810), therefore, the inferred data is validated immediately.

As above described, according to the embodiment 1, though only 1 character fails in demodulation caused by a dirty mark or the like on the bar code 21, it is possible to infer the demodulated data corresponding to the character failing in demodulation based on the demodulated data of other characters successful in demodulation. Besides, it is possible to verify whether this inference is good or not by comparing the bar width data pattern corresponding the inferred demodulated data and the bar width data actually obtained. Accordingly, it is possible to execute inference with high reliability.

[Embodiment 2]

According to the above-described embodiment, it is also possible to infer 1-character failing in demodulation in a case of the "divided reading" in which one bar code 21 is divided and read by a plurality of scanning, each bar width data group obtained by each scanning is demodulated, and a plurality of demodulated data provided by each demodulation are combined. However, when the continuous reading and the divided reading are compared, demodulated data provided by the continuous reading is provided with higher reliability. Thus, in the embodiment 2, the number of times of coincidence necessary for reading OK (the number of times when the result of the modulus 10 check becomes good) changes based on whether demodulated data is obtained by the continuous reading or by the divided reading.

In addition, the "divided reading" includes "3-1 reading" in which one bar code 21 is dividedly read by three times of scanning and one scanning overlaps with another scanning in the left data block and the right data block. However, in this case, there are two overlapped parts, therefore, there is a possibility in that a character is inferred in each of these overlapped parts. When a character is inferred in two parts in this case, reliability for inference result lowers remarkably. So, in the embodiment 2, a character is not demodulated in the "3-1 divided reading".

Figure 24:
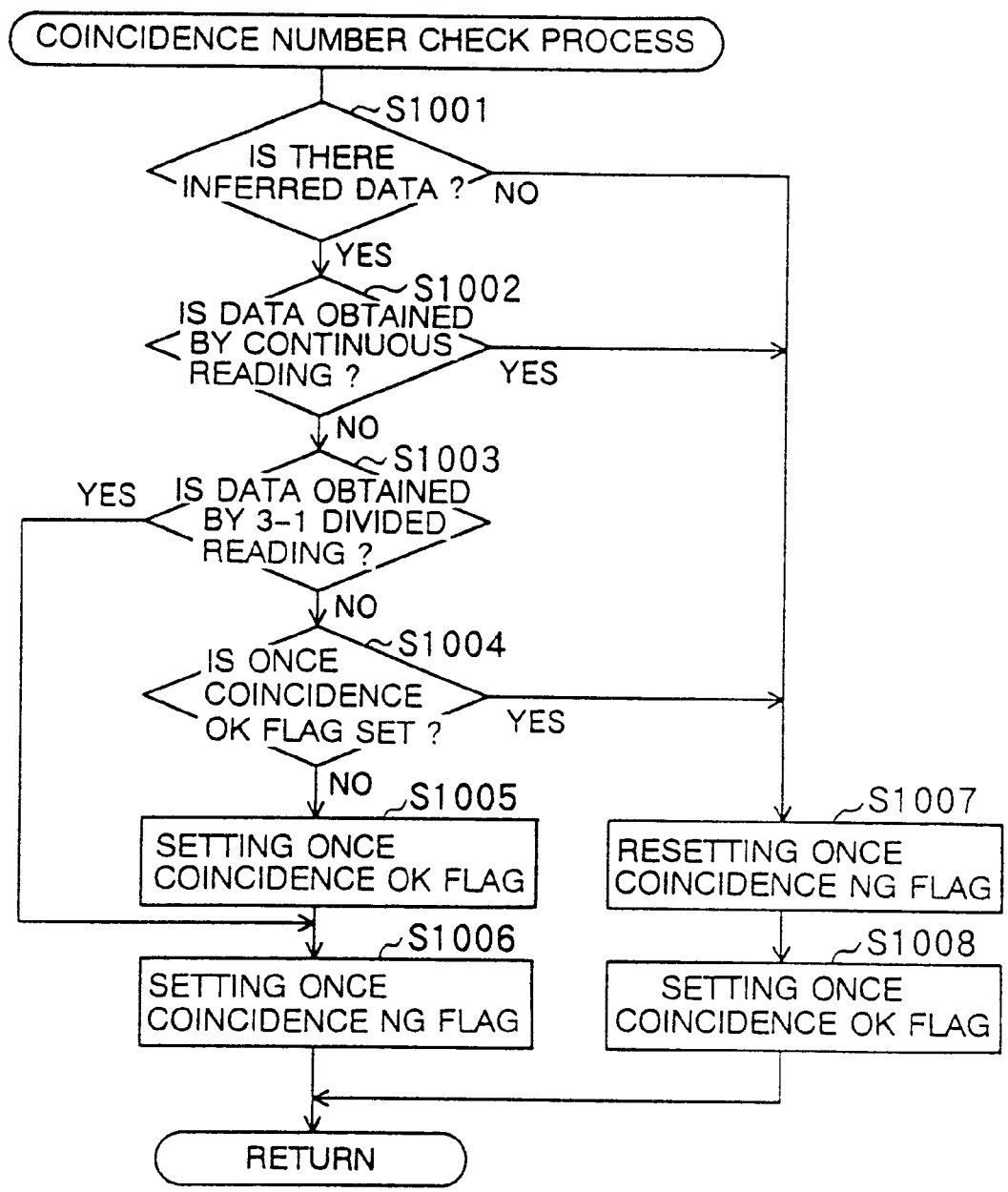
FIG. 24 is a flowchart showing a coincidence number check process subroutine executed in S013 shown in FIG. 10 according to an embodiment 2 of the present invention.

FIG. 24 is a flowchart showing a coincidence number check process subroutine executed in the S013 shown in FIG. 10 according to the embodiment 2 of the present invention. In the first S100 after entering this subroutine, the CPU 1 checks whether or not demodulated data inferred by the 1-character inherence process in the S007 or the S011 is included in the demodulated data to be objects of the modulus 10 check. The CPU 1 advances the process to the S1007 when no inferred demodulated data is included. In this case, since reliability of the result of the modulus 10 check is high, the CPU 1, in order to execute the reading OK process immediately, resets the "coincidence number times NG flag" in the S1007 and sets the coincidence number times OK flag" in the S1008, thereafter, terminates the coincidence number check process subroutine.

On the other hand, the CPU 1, when judging that the inferred demodulated data is included in the S1001, checks whether the demodulated data to be an object of the modulus 10 check is obtained by the continuous reading or not in the S1002. The CPU 1 advances the process to the S1007 when the demodulated data is obtained by the continuous reading. In this case, since reliability of the result of the modulus 10 check is high, the CPU 1, in order to execute the reading OK process immediately, resets the "coincidence number times NG flag" in the S1007 and sets the coincidence number times OK flag" in the S1008, thereafter, terminates the coincidence number check process subroutine (equivalent to the validating unit). On the other hand, when the CPU 1 judges that the demodulated data is not obtained by the continuous reading in the S1002, reliability of the result of the modulus 10 check is comparatively low, therefore, the CPU 1 advances the process to the S1003 under the condition indicating completion of reading, in that the result of the modulus 10 check becomes good twice (equivalent to the validating unit). In the S1003, the CPU 1 checks whether the demodulated data which is the object of the modulus 10 check is obtained by the "3-1 divided reading" or not. The CPU 1 advances the process to the S1006 when the demodulated data is obtained by the "3-1 divided reading". In this case, since reliability of the demodulated data is low, the CPU 1 resets the "coincidence number NG flag", and terminates this coincidence number check process subroutine.

On the other hand, the CPU 1, when judging that the demodulated data is not obtained by the 3-1 divided reading in the S1003, checks whether the "once coincidence OK flag" is already set or not in the S1004. When the "once coincidence OK flag" is not yet set, the result of the modulus 10 check becomes only once, the CPU 1, in order to execute the demodulation process for the next bar data group, sets the "once coincidence OK flag" in the S1005 and sets the "once coincidence NG flag", thereafter, terminates the once coincidence check process subroutine. On the contrary, when the "once coincidence OK flag" is already set, the result of the modulus 10 check becomes twice, the CPU 1, in order to execute the reading OK process, resets the "once coincidence NG flag" in the S1007 and sets the "once coincidence OK flag" in the S1008, thereafter, terminates the once coincidence check process subroutine.

After finishing this coincidence number check process subroutine, the CPU 1 returns the process to the main routine shown in FIG. 10.

The other configurations and the other operations in the embodiment 2 are just same as the embodiment 1, therefore, explanations thereof are omitted.

This invention being thus described, it will be obvious that same may be varied in various ways. Such variations are not to be regarded as departure from the spirit and scope of the invention, and all such modifications would be obvious for one skilled in the art intended to be included within the scope of the following claims.

What is claimed is:

1. A bar code reader, comprising:
   bar width pattern detection means for reading a bar code being stored with a plurality of data characters, each of said data characters obtained by coding a predetermined pieces of data satisfying a predetermined conditional expression to detect a bar width pattern;
   demodulation means for demodulating the bar width pattern detected by said bar width pattern detection means for each of the data characters and for outputting demodulated data; and
   data inference means, when one data character in the bar code fails in being demodulated, for executing an inverse operation of the conditional expression based on demodulated data obtained by demodulating the other data characters in the bar code with the demodulation means to infer data coded into the data character failing in being demodulated with the demodulation means.

2. A bar code reader according to claim 1, wherein said data character is obtained by coding an even-odd parity distinction and the data, and said bar code is stored with a plurality of the data characters in accordance with one combination among predetermined combinations of the even parity and the odd parity.

3. A bar code reader according to claim 2, wherein said demodulation means demodulates the bar width pattern detected by said bar width pattern detection means for each of the data characters and outputs the data and the even-odd parity distinction, and further comprising parity inference means, when said demodulation means falls in demodulation for one data character in the bar code, for specifying one of the predetermined combinations corresponding to a combination of even-odd parity distinctions obtained by demodulating the other data characters in the bar code with the demodulation means, and for reading the even-odd parity distinction corresponding to the data character failing in being demodulated with the demodulation means among the specified combinations.

4. A bar code reader according to claim 1, further comprising:
   comparison means for comparing a first bar width pattern corresponding to the data character failing in being demodulated with the demodulation means and a second bar width pattern corresponding to data inferred by the data inference means; and
   validating means for validating the data inferred by the data inference means only when the first bar width patten is coincide with the second bar width pattern at least partly as a result of comparison by said comparison means.

5. A bar code reader according to claim 4, wherein said comparison means compares bar widths of each pair of bars in the first bar width pattern and in the second bar width pattern, said each pair of bars corresponding to each other, and wherein said validating means validates the data inferred by the data inference means only when a ratio of bar widths of any one pair of bars is within a predetermined ratio.

6. A bar code reader according to claim 5, wherein said validating means, when a ratio of bar widths of any one pair of bars is within a first predetermined ratio, immediately validates the data, and, when the ratio of bar widths of any one pair of bars is within a second predetermined ratio exceeding the first predetermined ratio, restarts said bar width pattern detection means, said demodulation means and said data inference means, and validates the data only when a the ratio of bar widths of the pair of bars in within the second predetermined ratio after the restarting.

7. A bar code reader according to claim 3, further comprising:
   comparison means for comparing a first bar width pattern corresponding to the data character failing in being demodulated with the demodulation means and a second bar width pattern corresponding to data inferred by the data inference means and corresponding to the even-odd parity distinction inferred by said parity inference means; and
   validating means for validating the data inferred by the data inference means and the even-odd parity distinction inferred by said parity inference means only when the first bar width patten is coincide with the second bar width pattern at least partly as a result of compression by said comparison means.

8. A bar code reader according to claim 7, wherein said comparison means compares bar widths of each pair of bars in the first bar width pattern and in the second bar width pattern, said each pair of bars corresponding to each other, and wherein said validating means validates the data inferred by the data inference means and the even-odd parity distinction inferred by said parity inference means when a ratio of bar widths of one pair of bars is within a predetermined ratio.

9. A bar code reader according to claim 8, wherein said validating means, when a ratio of bar widths of any one pair of bars is within a first predetermined ratio, immediately validates the data, and, only when the ratio of bar widths of any one pair of bars is within a second predetermined ratio exceeding the first predetermined ratio, restarts said bar width pattern detection means, said demodulation means, said data inference means and said parity inference means, and validates the data and the distinction of an even party or an odd parity only when a the ratio of bar widths of the pair of bars is is within the second predetermined ratio after restarting.

10. A bar code reader according to claim 1, further comprising:

validating means for immediately validating the data inferred by the data inference when said demodulation means demodulates data characters except one data character in the bar code based on a bar width pattern obtained by once scanning with said bar width pattern detection means, and for restarting said bar width pattern detection means, said demodulation means and said data inference means and for validating the data inferred by the data inference after the restarting when said demodulation means demodulates data characters except one data character in the bar code based on a bar width pattern obtained by plural times of scanning with said bar width pattern detection means.

11. A bar code reader according to claim 3, further comprising:

validating means for immediately validating the data inferred by the data inference means and the even-odd parity distinction inferred by the parity inference means when said demodulation means demodulates data characters except one data character in the bar code based on a bar width pattern obtained by once scanning with said bar width pattern detection means, and for restarting said bar width pattern detection means, said demodulation means and said data inference means and for validating the data inferred by the data inference means and the even-odd parity distinction inferred by the parity inference means after the restarting when said demodulation means demodulates data characters except one data character in the bar code based on a bar width pattern obtained by plural times of scanning with said bar width pattern detection means.

12. A method of reading a bar code, comprising:

a step of reading a bar code being stored with a plurality of data characters obtained by coding a predetermined pieces of data satisfying a predetermined conditional expression to detect a bar width pattern;

a step of demodulating the bar width pattern which is detected for each of the data characters and of outputting demodulated data; and a step, when one data character fails in being demodulated, of executing an inverse operation of the conditional expression based on data obtained by demodulating the other data characters in the bar code to infer data coded into the data character failing in being demodulated.

* * * * *